US008195147B2

(12) United States Patent
Bonnet et al.

(10) Patent No.: US 8,195,147 B2
(45) Date of Patent: Jun. 5, 2012

(54) METHOD OF ENABLING A COMBINATIONAL SERVICE AND COMMUNICATION NETWORK IMPLEMENTING THE SERVICE

(75) Inventors: Mario Bonnet, Turin (IT); Pino Castrogiovanni, Turin (IT); Antonio Garofalo, Turin (IT); Gianni Luca Guglielmi, Turin (IT)

(73) Assignee: Telecom Italia S.p.A., Milan (IT)

( * ) Notice: Subject to any disclaimer, the term of this patent is extended or adjusted under 35 U.S.C. 154(b) by 335 days.

(21) Appl. No.: 12/086,276

(22) PCT Filed: Dec. 9, 2005

(86) PCT No.: PCT/IT2005/000725
§ 371 (c)(1),
(2), (4) Date: Apr. 14, 2009

(87) PCT Pub. No.: WO2007/066364
PCT Pub. Date: Jun. 14, 2007

(65) Prior Publication Data
US 2009/0305688 A1 Dec. 10, 2009

(51) Int. Cl.
*H04W 76/02* (2009.01)
(52) U.S. Cl. ............... 455/422.1; 370/352; 379/202.01
(58) Field of Classification Search ............. 455/422.1; 370/352; 379/202.01
See application file for complete search history.

(56) References Cited

U.S. PATENT DOCUMENTS

| 5,949,763 | A | | 9/1999 | Lund | |
|---|---|---|---|---|---|
| 6,148,068 | A | * | 11/2000 | Lowery et al. | 379/202.01 |
| 6,370,137 | B1 | | 4/2002 | Lund | |
| 6,807,563 | B1 | * | 10/2004 | Christofferson et al. | 709/204 |
| 7,058,067 | B1 | * | 6/2006 | Corley et al. | 370/408 |
| 7,653,192 | B1 | * | 1/2010 | Sylvain | 379/202.01 |
| 2001/0023430 | A1 | * | 9/2001 | Srinivasan | 709/204 |
| 2003/0026394 | A1 | | 2/2003 | Chapman et al. | |
| 2004/0252674 | A1 | | 12/2004 | Soininen et al. | |
| 2005/0058125 | A1 | * | 3/2005 | Mutikainen et al. | 370/354 |
| 2005/0094579 | A1 | * | 5/2005 | Acharya et al. | 370/260 |
| 2006/0114884 | A1 | * | 6/2006 | Remaker | 370/352 |
| 2007/0172043 | A1 | * | 7/2007 | Keller | 379/202.01 |
| 2008/0062966 | A1 | * | 3/2008 | den Hartog et al. | 370/352 |

(Continued)

FOREIGN PATENT DOCUMENTS
EP 1 317 108 A1 6/2003

(Continued)

OTHER PUBLICATIONS

Olsson, U. et al., "Combinational Services—The Pragmatic First Step Toward AII-IP," Ericsson Review No. 2, pp. 66-71, (2003).

(Continued)

*Primary Examiner* — Marivelisse Santiago Cordero
*Assistant Examiner* — Jean Chang
(74) *Attorney, Agent, or Firm* — Finnegan, Henderson, Farabow, Garrett & Dunner, L.L.P.

(57) ABSTRACT

A method for enabling a combinational service in a communication network in which a plurality of terminals can operate, includes: establishing a first plurality of connections toward the plurality of terminals based on first terminal identifiers, providing a management entity with the first identifiers; providing the management entity with second identifiers of selected terminals included in at least part of said plurality; associating the first identifiers and the second identifiers with the combinational service; and establishing, by means of the management entity, a second plurality of connections toward said selected terminals by employing the second identifiers.

37 Claims, 19 Drawing Sheets

U.S. PATENT DOCUMENTS

2009/0073963 A1 * 3/2009 den Hartog et al. .......... 370/352

FOREIGN PATENT DOCUMENTS

| EP | 0 847 178 B1 | | 1/2004 |
| EP | 1465386 A1 | * | 10/2004 |
| GB | 2 408 654 A | | 6/2005 |

OTHER PUBLICATIONS

Nokia (White Paper), "Video Sharing—Enrich Your Voice Call with Video," http://www.nokia.com/BaseProject/Sites/NOKIA_MAIN_18022/CDA/Categories/Phones/Technologies/VideoSharing/_Content/_Static_Files/video_sharing_a4_2510.pdf, pp. 1-11, (2005).

Handley, M. et al., "RFC 1327: SDP: Session Description Protocol," Network Working Group Request for Comments, pp. 1-42, XP00278846, (Apr. 1998).

3GPP TS 23.228 v6.1.0, 3rd Generation Partnership Project, Technical Specification Group Services and System Aspects, IP Multimedia Subsystem, (IMS), Stage 2, Release 6, pp. 1-137 (Mar. 2003).

* cited by examiner

METHOD OF ENABLING A COMBINATIONAL SERVICE AND COMMUNICATION NETWORK IMPLEMENTING THE SERVICE

CROSS REFERENCE TO RELATED APPLICATION

This application is a national phase application based on PCT/IT2005/000725, filed Dec. 9, 2005, the content of which is incorporated herein by reference.

TECHNICAL FIELD OF THE INVENTION

The present invention generally relates to the field of communication networks, and particularly to the communication networks implementing combinational services. More in particularly, the present invention relates to mobile communication networks, such as cell phone networks.

BACKGROUND OF THE INVENTION

Mobile phone networks have been initially conceived for allowing speech communication, similarly as with Public Switched Telephone Network (PSTN) but between mobile users. Mobile phone networks have experienced, and they are presently experiencing, a huge expansion, particularly subsequent to the introduction of the second-generation mobile networks, and notably digital mobile networks, such as those complying with the Global System for Mobile Communication (GSM) standard, and the corresponding systems adopted in the US, and in Japan.

Similarly to PSTN, the second-generation mobile networks are circuit switching networks; this greatly restrains the bandwidth which can be allocated for a certain user, particularly with second-generation mobile networks. In contrast, the data communication networks such as computer networks and, among these, the Internet, adopt packet switching schemes that allow much greater data transfer speeds.

A number of solutions have been proposed for overcoming the restraints of the traditional circuit switching mobile networks such as GSM networks, such as to allow the mobile terminal users to utilize the services offered by the Internet in an effective manner. One of the solutions that are becoming quite popular is the General Packet Radio Service (GPRS). GPRS is a mobile digital technology compatible with GSM networks (actually, it is constructed on the existing GSM network architecture) which allows higher speed data transfer than with pure GSM. Essentially, GPRS can be seen as an addition to GSM, which supports and makes feasible packet data communication. While third-generation wireless communication systems such as those complying with the Universal Mobile Telecommunication System (UMTS) standard are more promising in terms of data transfer speed, GPRS is nevertheless a solution at hand for improving the data exchange capacity in existing GSM networks.

The services offered by these mobile networks in addition to simple speech communications have quickly increased in quality and number; just to quote some examples, Short Messaging Systems (SMS) and Multimedia Messaging Systems (MMS), as well as Internet connection services have been recently provided.

Particularly, there is much interest in providing the mobile network users with multimedia services, i.e. services by which images, videos, data access through the Internet or e-mail can be added to a speech communication between users. Among these services, the so-called "combinational services" are attracting many mobile providers.

By "combinational service" herein is generally meant a service through which a terminal in a communication network (not necessarily a mobile one) can participate in two or more connections at the same time, which may be also based on different domains.

U. Olsson and M. Nilsson, in the article entitled "Combinational services—The pragmatic first step toward all-IP", Ericsson Review No. 2, 2003, describe, inter alia, an example of the so-called "combinational services" in which the possibility is exploited of managing traffic in both circuit connection and packet connection at the same time: image sharing during a conversation between two users. The authors note that traffic can be simultaneously managed in a circuit connection and packet connection both with Wideband Code Division Multiple Access (WCDMA), which allows using multiple and parallel bearers in the "over-the-air" interface (multiple radio access bearers, multi-RAB) and with GSM, in which similar possibilities are offered by a standardized mechanism—the dual transfer mode, DTM.

Another description of a service that can be utilized by means of mobile terminals, similar to that discussed above, is given in White Paper "Video sharing—Enrich your voice call with video", by Nokia Corporation, which is available for download at http://www.nokia.com/BaseProject/Sites/NOKIA_MAIN_18022/CDA/Categories/Phones/Technologies/VideoSharing/_Content/_Static_Files/video_sharing_a4_2510.pdf The real-time video sharing service allows two users to easily enrich their communication during a telephone conversation. Either of the users can share a live video recorded by a video camera, or video clips on his/her terminal. Both users watch the same video and can discuss the latter while continuing their voice call.

EP-A-847178 describes a multimedia conference service that employs parallel networks. This service offers the possibility of carrying out a voice conference by means of a PSTN network, and a data conference by means of a Internet or Web network. The network described in this document provides a conference management server administered by the PSTN network, which is able of controlling services offered by the PSTN network in response to signals from the external network, such as the Web network. The conference management server may be either administered by the PSTN network or simply it may be able of interworking with the PSTN network. In relation with image data, the conference management server is able of distributing these data to several voice conference participants.

SUMMARY OF THE INVENTION

The Applicant notes that both the documents concerning the combinational services established between two users, and those concerning the services established between more users (i.e. conference services) do not provide useful teachings for the users to implement service enabling, particularly a conference service, in a sufficiently convenient manner. Particularly, the Applicant notes that prior techniques do not offer an automatic procedure for establishing a combinational service that provides a data conference in addition to a voice conference.

The restraints discussed above concerning the conventional technologies have been overcome by systems and methods discussed in the present disclosure. For example, an embodiment is directed to a method of enabling a combinational service in a communication network. Furthermore, another embodiment is directed to a method for utilizing a combinational service. According to another aspect, an embodiment provides an application suitable for being installed on a management apparatus for a combinational service. A further embodiment is directed to a management apparatus for a combinational service. Furthermore, yet another embodiment is directed to a communication network.

To better understand the present invention and appreciate the advantages thereof, a number of non-limiting, exemplary embodiments of the same will be described below, with reference to the annexed figures, in which:

DETAILED DESCRIPTION OF EXAMPLES OF THE INVENTION

Figure 1:
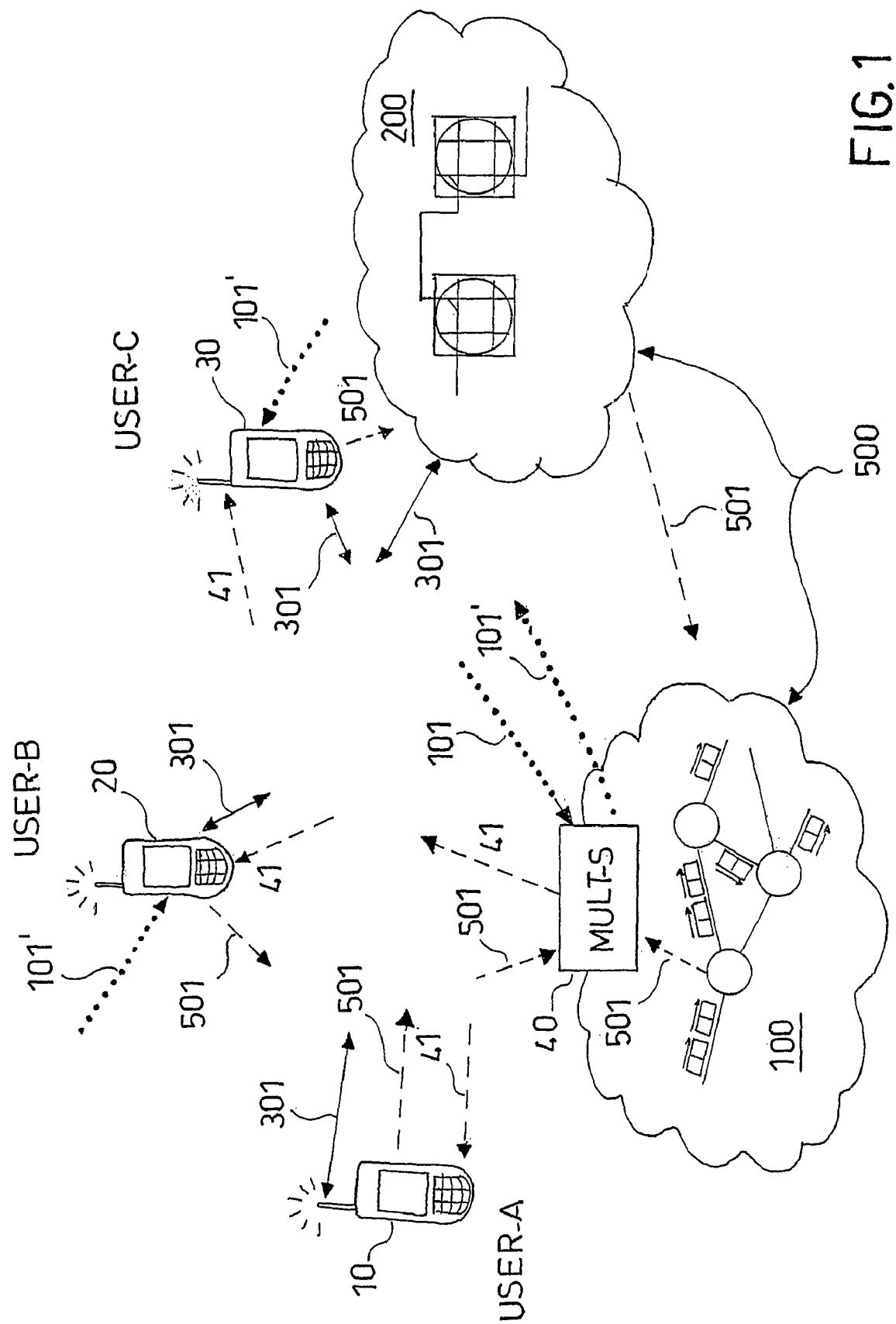
FIG. 1 illustrates, by way of example, a mobile communication network capable of supporting a combinational service.

FIG. 1 illustrates an exemplary telecommunication network 500 such as, preferably, a network capable of providing mobile services. For example, the network 500 is made according to the Global System for Mobile communications/General Packet Radio Service (GSM/GPRS) standard or according to the Universal Mobile Telephone Service (UMTS) standard. Furthermore, the network 500 is, according to the example described, capable of establishing simultaneous connections by means of circuit switching and by means of packet switching.

For clarity purposes, the possibility of operating both by circuit switching and packet switching has been depicted in FIG. 1 with two different subnetworks or domains, such as: a subnetwork or circuit domain 200 (operating by circuit switching) and a subnetwork or packet domain 100 (operating by packet switching). In the mobile network 500, first 10, second 20 and third 30 terminals operate, such as of the mobile type, which are associated with a first USER_A, second USER_B, and third USER_C, respectively. These mobile terminals may be, for example, cell phones, Personal Digital Assistant (PDA) devices. While reference will be made herein below to mobile terminals, the terminals 10, 20 and 30 or some of them may be communication terminals of the non-mobile type (e.g., they may be fixed phones or personal computers). In any case, each of the terminals 10, 20 and 30 is capable of using a combinational service and, accordingly, operating with two different connections at the same time, such as connections based on the packet subnetwork 100, and circuit subnetwork 200. The two connections which the terminals 10-30 can simultaneously utilize may also be based on the same (e.g., either circuit- or packet-) subnetwork, and typically they each refer to the exchange of distinct information, such as voice or data information.

According to the example described, the users associated with the terminals 10-30 can talk to each other either by employing the circuit subnetwork 200, i.e. by means of a circuit connection, or by employing the packet subnetwork 100 (for example, to connect to a website or an e-mail server of their own) by means of a packet connection. The network 500 may comprise a greater number of terminals.

Advantageously, the network 500 also offers an audio-conference service, i.e. it allows the terminals 10, 20, 30 to participate (e.g. by means of a circuit connection) to an audio conference, i.e. exchange first voice information, by means of a telephone (circuit) connection, which communicates more than two mobile terminals with each other (for example, the three terminals 10, 20 and 30). Furthermore, advantageously, the users of the mobile communication network 500 can also use a combinational service, in addition to the audio-conference service. Particularly, the combinational service implemented by the network 500 offers the possibility of performing the audio-conference, by means of the circuit subnetwork 200, simultaneously with a "data-conference", for example by means of the packet subnetwork 100, and involving more than two terminals between those involved in the audio-conference.

By "data conference" is meant that data are shared between more than two terminals, such as information other than the voice information exchanged in the audio conference. According to a particular example, these data exchanged in the data conference may correspond to either still images or moving images (i.e. videos), though they may be also files, electronic documents, software applications or multimedia applications. As used herein, the term "image" is meant below to comprise either a single image or more images, of any type, whether still or moving, either recorded in real time or registered and stored in a memory area on the user terminal or a network server.

For brevity, the above combinational service, which provides an audio conference with the possibility of adding a simultaneous exchange of data between the participants in the conference, will be designated below as the "audio-data conference service".

Several practical examples of using the audio-data conference service will be given below.

In accordance with a first example, a user can send a series of still images or a video (a video clip either pre-recorded or recorded in real-time by a video camera built in the mobile terminal) from his/her mobile terminal to the other parties' terminals, by utilizing the packet connection, and at the same time he/she can make comments on the images displayed on all the terminals, together with the other users. In another example, the shared use of "Collaborative Working" programs, such as "electronic blackboards", or shared editing of documents/images, etc, can be provided between the terminals 10-30.

As will be more clearly understood from the description below, the management of the audio-data conference is relied to a multicast entity 40 (MULT-S) such as a hardware processing apparatus and/or one or more software modules. This multicast entity (called the Multicast Server 40 herein below) is, for example, a server apparatus suitable to operate both in the packet subnetwork 100 and also with apparatuses in the circuit network 200.

Figure 19:
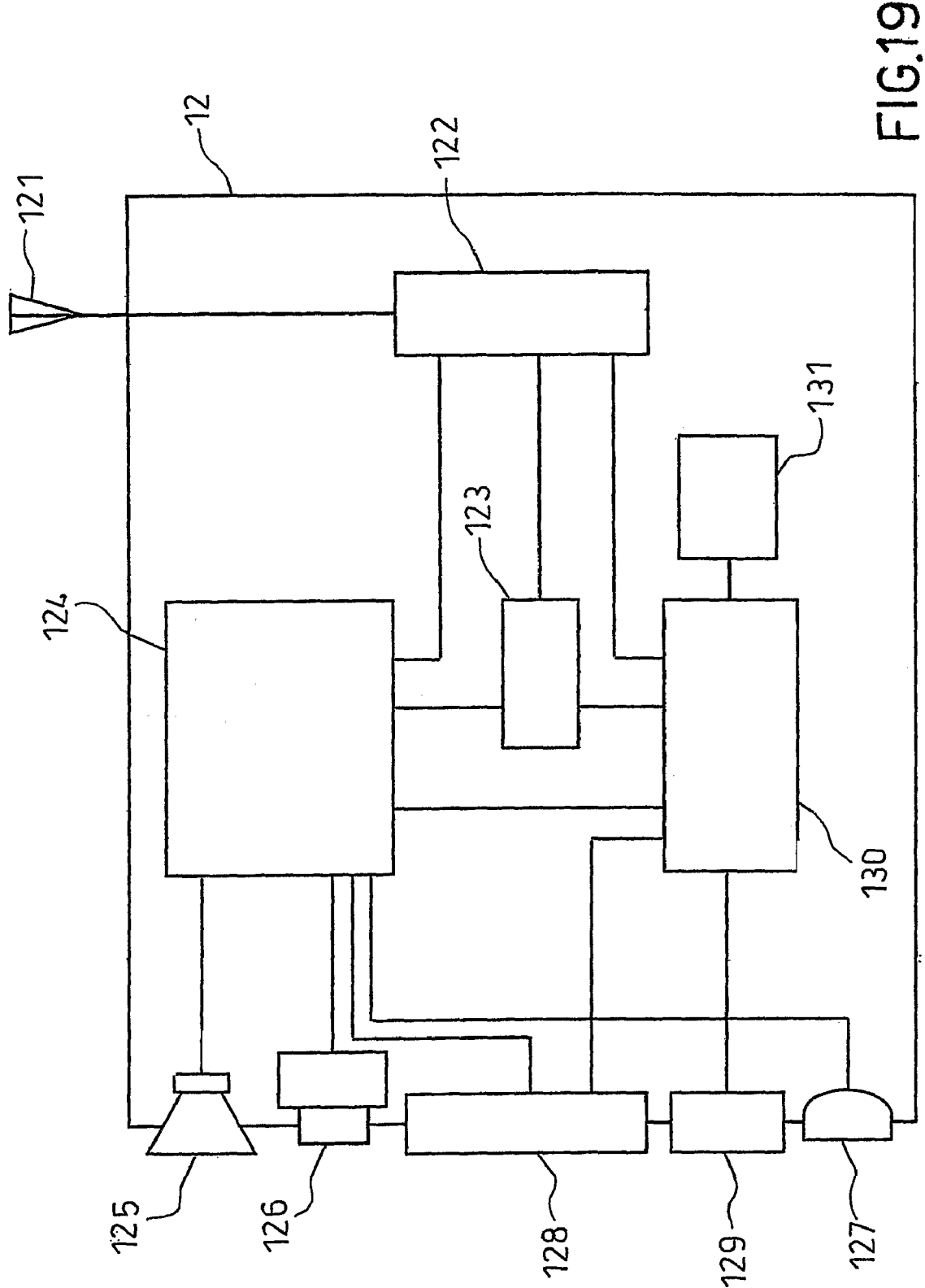
FIG. 19 illustrates, in a schematic manner and by functional blocks, an exemplary mobile terminal capable of using a combinational service.

For completeness of description, in FIG. 19 there is schematically illustrated with functional blocks an exemplary embodiment of the first mobile terminal 10 and/or the other terminals 20 and 30. The first mobile terminal 10 comprises an antenna 121 suitable for transmission/reception, a radio frequency transceiver 122, a GPRS module 123, a encoding/decoding unit 124, a loudspeaker 125, a photo camera (and/or preferably, a video camera) 126, a microphone 127, a display 128, a keyboard 129, a processor (or CPU, Central Processing Unit) 130 with a memory 131 being associated thereto. The first mobile terminal 10 is typically associated to a Subscriber Identity Module (SIM), not illustrated in FIG. 19, through suitable electric contacts.

The antenna 121 and the radio frequency transceiver 122 conventionally enable communication to and from the radio base stations in the mobile network. The loudspeaker 125 and microphone 127 conventionally turn an electric signal corresponding to the voice in a signal that can be heard by a user of the mobile terminal 12, and vice versa. The keyboard 129 conventionally enables the user to manually interact with the mobile terminal to input commands, for example, related to a menu option selection, or a phone number selection, etc. The display 128 can be, for example, a Liquid Crystal Display (LCD), and is conventionally able to display data (e.g. a video). The video camera 126, such as a Charge-Coupled Device (CCD), is conventionally able to capture a video. The GPRS module 123 conventionally includes a packing/unpacking device and a buffer, and is suitable to encapsulate in packets the radio blocks from the mobile network, or unpack in radio blocks the packets provided by the upper protocol layers, for delivery to the mobile network, through the radio frequency transceiver 122 and the antenna 121.

The encoding/decoding unit (such as a H.263 video codec) 124 is connected to the loudspeaker 125, microphone 127, display 128 and video camera 126: it conventionally manages the coding/decoding of the video either captured by the video camera 126 or to be transmitted on the display 128, and/or the audio component either captured by the microphone 127 or to be transmitted to the loudspeaker 125. The processor 130 supervises the operation and activities of the various modules included in the mobile terminal 12. The memory 131, associated with the processor 130, includes software applications for managing the communication. Particularly, the memory 131 includes a software application for controlling and managing at least one combinational service. It should be noted, in addition, that while in FIG. 19 the encoding/decoding unit 124 is shown as a separate entity, it may also be provided by means of a software program resident in the memory 131 of the mobile terminal 12.

In the mobile terminal of a user enabled to utilize a combinational service there is installed a software application for controlling and managing the combinational service. This software application can be provided as a separate client application, that can be either installed on the mobile terminal operating system, or "cabled" in the mobile terminal firmware. Particularly, the software application comprises modules configured for controlling the establishment of the connections from the mobile terminal to the circuit subnetwork 200 and the packet subnetwork 100. The software application can be started automatically upon switching on the mobile terminal. It may be provided, however, that the user can disable the automatic start of the application, or that the application is manually run by the user.

Preferably, the software application operates in the background such that it is quite "invisible" to the user during the normal use of the mobile terminal. When executed, the software application can identify the signallings of events related to calls that have been made to and/or from the mobile terminal.

Figure 2:
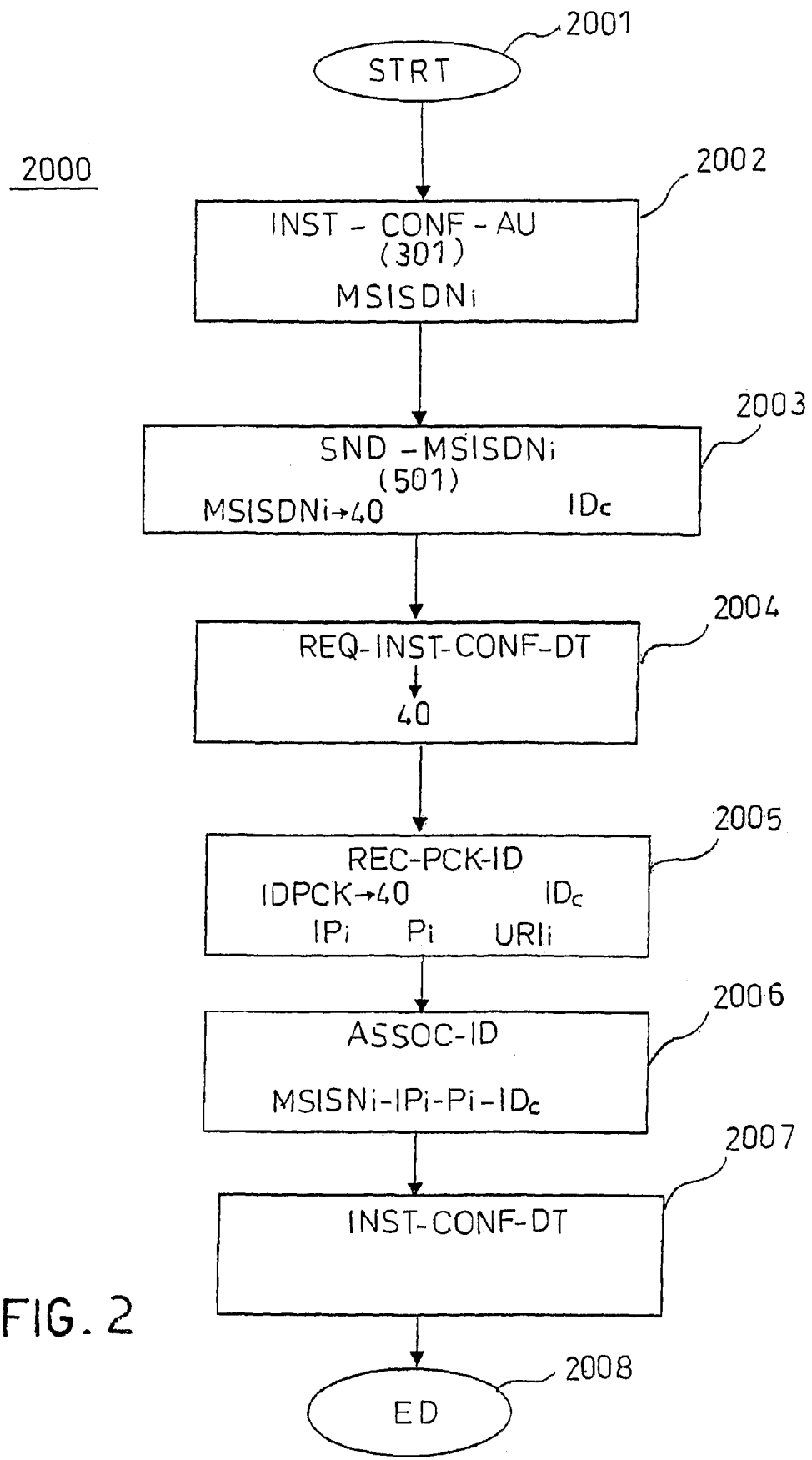
FIG. 2 illustrates, by means of a flow chart, an exemplary method of enabling a combinational service, that can be implemented by means of the network from FIG. 1.

In FIG. 2 there is shown, in the form of a flow diagram, a first example of a method 2000 of enabling a combinational service (such as an audio-data conference) in accordance with the invention. After a symbolic start step (STRT, 2001), the establishment (step INST-CONF-AU, 2002) of the audio-conference is performed by means of a circuit connection based on the circuit subnetwork 200. During the audio-conference, the users of the mobile terminals 10, 20 and 30 talk to their respective terminals and exchange information in the form of voice signals, which are depicted in FIG. 1 with numeral 301 and a solid line.

Particularly, the establishment of the audio-conference can be based on the fact that the circuit subnetwork 200 knows first circuit-network identifiers which identify each of the mobile terminals 10-30. For example, a circuit-network identifier comprises at least the conventional MSISDN identifier (Mobile Station ISDN) of each terminal 10-30 (herewith below, $MSISDN_A$, $MSISDN_B$ and $MSISDN_C$, respectively). The MSISDN identifier, also known as the Client Line Identifier (CLI), identifies the mobile terminal subscription in the PSTN numbering plan. The MSISDN identifiers of the mobile terminals 10-30 will be generally referred to as $MSISDN_I$.

Furthermore, the method 200 provides that signalling operations are performed which allow providing (step SND-MSISDN$_I$, 2003) the Multicast Server 40 with the first circuit-network identifiers MSISDN$_I$. Particularly, these operations are carried out by the mobile terminals 10, 20 and 30, and by other management entities being part of the network 500 (not shown in FIG. 1), by means of signalling messages 501 (illustrated with a dash line in FIG. 1) that carry the first identifiers MSISDNi characteristic of the terminals/users involved in the audio-conference established and capable of being involved in the data-conference to be established. Furthermore, according to the particular example as described, the circuit-network communication identifiers sent to the Multicast Server 40 may also comprise a further identifier ID$_C$ characterizing the audio conference being established.

According to the example considered, one of the users of the mobile terminals 10, 20 and 30 involved in the audio conference desires to share data, such as images, with the other users and, accordingly, establish another connection. This other connection will be typically established subsequent to the audio-conference, and will be developed simultaneously to the latter, thereby allowing also a data-conference to be carried out which, such as provided in the above example, will take place by means of a packet connection.

For example, a request for establishing another connection (for example, by the third terminal 30) to also enable the data-conference is transmitted (step REQ-INST-CONF-DT, 2004), and it is received by the Multicast Server 40. Preferably, the Multicast Server 40 is also able of managing collision events that may occur when more data-conference users desire to send data to the other users. To the purpose, the Multicast Server 40 is provided with a queue management software.

To enable the data-conference, which is mainly managed by the Multicast Server 40, signalling operations are provided, according to the example, which allow a suitable packet connection to be established for data sharing. Among these signallings, there are procedures which, according to different possible modes, allow the Multicast Server 40 to be provided with (step REC-PCK-ID, 2005) second identifiers of the terminals (among those 10-30 involved in the audio conference) which are used to established the second connection on which the data-conference is based. These second identifiers are, for example, packet network identifiers IDPCK to which one or more of the first identifiers that have already been sent (step 2003) can be optionally added.

The packet network identifiers IDPCK identify each of the mobile terminals in accordance with the particular protocol to be employed for the packet connection (in the subnetwork 100). For example, a packet network identifier comprises at least the Internet Protocol (IP) of the respective terminal, i.e. the address of the mobile terminal in the packet subnetwork. To the terminals 10-30 there are associated the IP addresses that are generally designated with the symbol IP$_I$ and designated with the symbols: IP_A, IP_B and IP_C, respectively. The packet network identifiers also comprise, advantageously, further identifiers which are associated to each terminal and indicating further characteristics required for packet communication. An example of a further packet network identifier is the "port" identifier (P$_I$) that each of said terminals 10-30 will employ for packet communication.

As will be understood by those skilled in the art, the information concerning the (target or source) port is contained in each packet and is typical of the particular Transmission Protocol (TCP or UDP, User Datagram Protocol) used by IP protocol.

As will be discussed below, other packet network identifiers, to which step 2005 may be referred, are Uniform Resource Indicator (URI) identifiers employed by the SIP protocol. The URI identifiers of the three terminals 10-30 will be generally designated with URI$_I$.

The Multicast Server 40 is able to associate (step ASSOC-ID, 2006) the first identifiers (the numbers MSISDNi and the conference identifier ID$_C$) and the second IDPCK identifiers (such as the addresses IP$_I$ and the ports P$_I$) to the same combinational service, and particularly, to the respective terminals involved in the audio-conference and to be also involved in the data-conference, not yet enabled.

Thereby, the Multicast Server 40, which is provided with all the information allowing the same to communicate with the mobile terminals 10-30 by means of the packet network 100, carries out the procedures required to establish (step INST-CONF-DT, 2006) the connection on which the data-conference is based, such that the combinational service can be suitably enabled (symbolic end step ED, 2008).

It should be observed that, as will be apparent from the example described below, the operations illustrated in FIG. 2 may also take place in a different order from that indicated in the flow diagram and may also require that other identifiers are employed, in addition to or in replacement of those described above. Furthermore, a situation may also occur, where both or either one of the two distinct connections actually operate by connecting only two users because other users have left the conference service or have not yet joined the latter.

Figure 3:
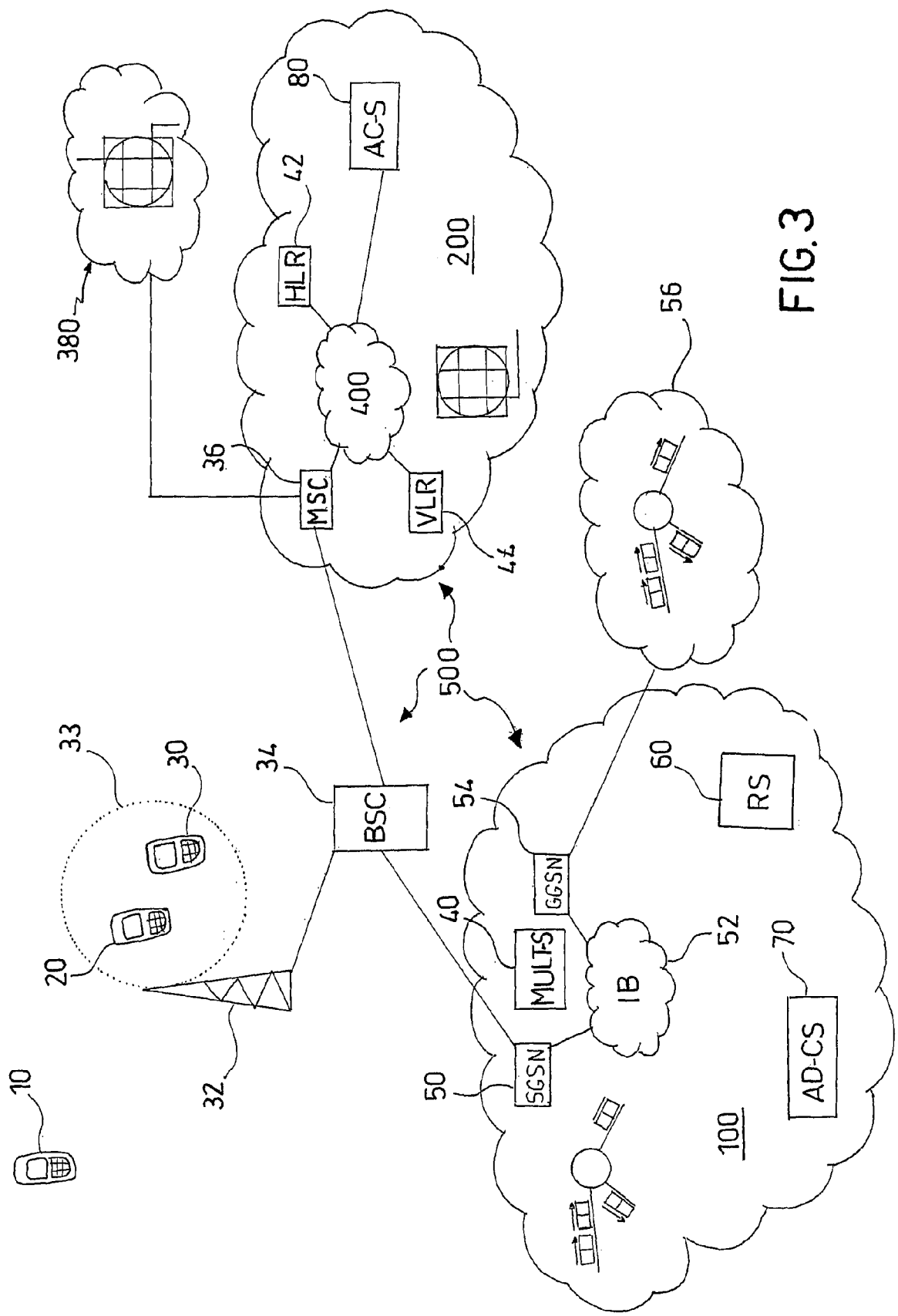
FIG. 3 illustrates, by way of example, a first preferred embodiment of the mobile communication network from FIG. 1.

With reference to FIG. 3, a first embodiment of the network 500 will be now described. In FIG. 3 and in the subsequent figures, the same numerical or alphanumerical references will be used for designating those elements that have been described above with reference to the preceding figures. FIG. 3 shows an example of mobile communication network 500 capable of providing mobile services according to the GSM/GPRS standard. The mobile terminals 10, 20 and 30 communicate on a radio interface with one or more Base Transmitter Stations (BTS) 32. Each base transmitter station 32 supplies a mobile telephone service in a corresponding geographical area 33 which is commonly known as the "cell".

Different base transmitter stations 32 are connected to a base control station (Base Station Controller-BSC) 34, that manages the allocation and deallocation of radio resources and controls handovers of the mobile terminals from a base transmitter station to another. A BSC and the base transmitter stations being associated therewith are typically indicated as the Base Station Subsystem (BSS). The BSC 34 is connected to a Mobile Switching Center (MSC) 36 in the circuit subnetwork 200, through which the circuit connections can be also established to other circuit networks 380, such as Public Switched Telephone Networks (PSTN) or Integrated Services Digital Networks (ISDN). Typically, in capillary mobile networks, a plurality of BSCs, such as BSC 34 shown in FIG. 3, is connected to an individual MSC.

The MSC 36 is also connected, through a signalling network 400 (for example, a signalling network according to the Signalling System #7, or SS7) to a Home Location Register (HLR) 42, and a Visitor Location Register (VLR) 44. The VLR 44 includes a database containing information concerning all the mobile terminals which are instantaneously present in a corresponding geographical area, such as temporary subscription data of the mobile service subscribers, which are required by MSC for supplying services in that geographical area.

The HLR 42 comprises a database which stores and manages the subscriptions of the mobile network 500 users, such as the users of the mobile terminals 10, 20 and 30. For each subscriber, the HLR contains permanent subscription data, such as for example the telephone number (Mobile Station ISDN, or MSISDN), and an International Mobile Subscriber Number (IMSN), i.e. an international unique identifier which is allocated to each subscriber and used for signalling in the circuit domain of mobile networks. Additionally, the HLR 42 contains a list of services that a mobile network subscriber is authorized to use (in a so-called "profile"), and the address of the VLR which is instantly serving this subscriber.

Each BSC 34 is also connected to the packet subnetwork 100 and a Serving GPRS Support Node (SGSN) 50, which is responsible for the delivery of the packets to the mobile terminals which are within its service area. In capillary mobile networks, a plurality of BSC is connected to an individual SGSN. A Gateway GPRS Support Node (GGSN) 54 acts as the logic interface to external packet networks, such as for example an external network IP 56 (for example, the Internet). The nodes SGSN 50 and GGSN 54 are typically connected to each other by an IP backbone 52.

The mobile communication network 500 from FIG. 3 is thus a part of a larger communication network, which involves external circuit networks (embodied by network 38), and external packet networks (embodied by network 56). The users of the mobile communication network 500 can talk with users of the external network 380 on a circuit connection, as well as connect either to a website or their own e-mail server in the external network IP 56 on a packet connection.

Furthermore, the packet network 100 typically includes; in addition to the above Multicast Server 40, an entity 60, a server operating according to a Radius protocol (referred to as the Server Radius 60, RS herein below), which is able to control the user's credentials (i.e. whether he is entitled to packet services) as well as store the IP address and the respective MSISDN of each mobile terminal during the packet network connections of the mobile network.

Particularly, the packet network 100 also comprises a management entity 70 (AD-CS) which is able to manage signalling procedures related to the establishment of the data-conference subsequently to the establishment of the audio-conference, by co-operating with the Multicast Server 40. This management entity 70 is, for example, a server and will be called the Audio-Data Server 70 herein below. The circuit network 200 is also provided with an audio-conference management entity, this entity is for example a server and will be called the Audio-Conference Server 80 (AC-S).

Figure 4:
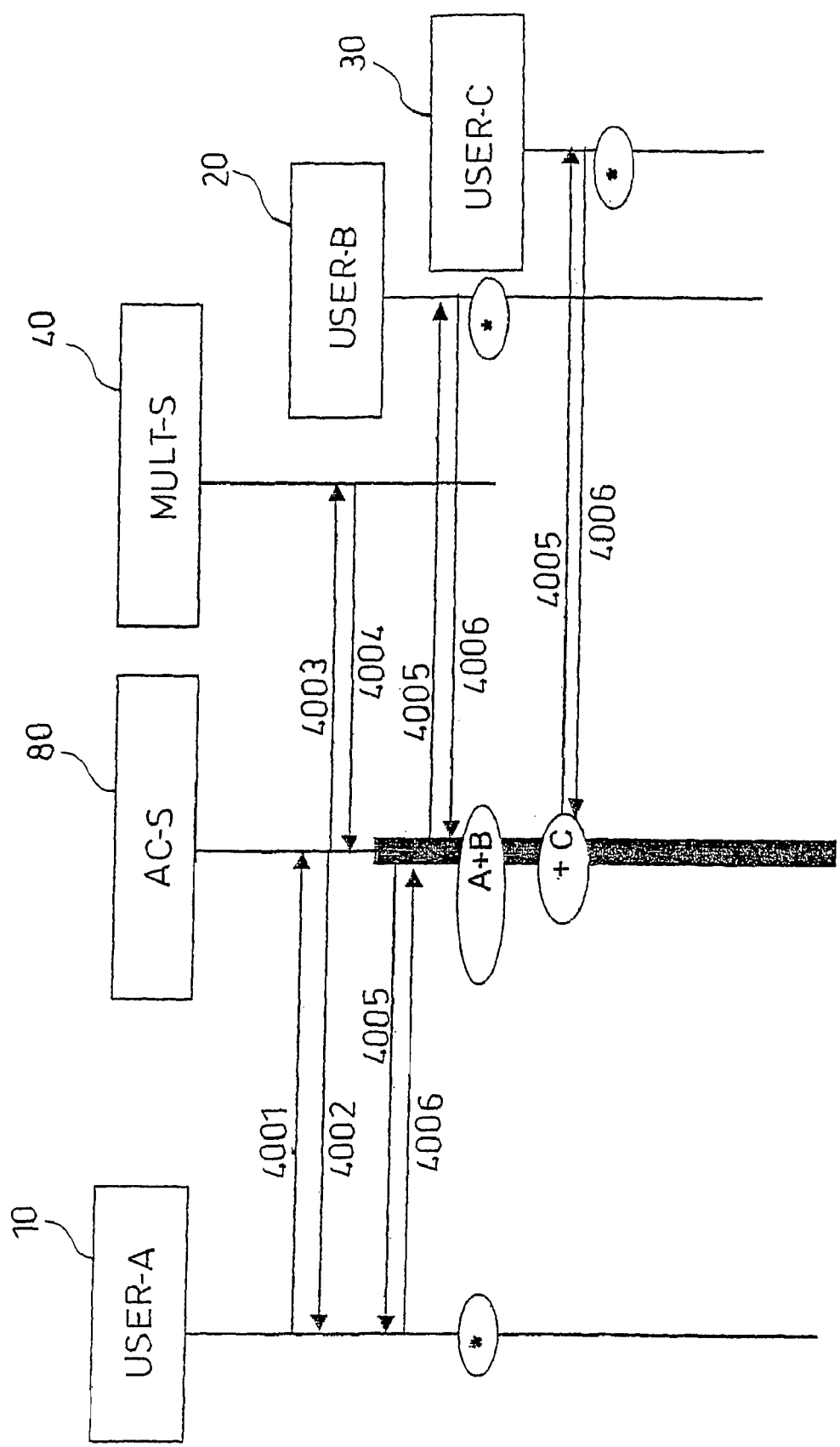
FIG. 4 illustrates an exemplary flow of operations concerning the establishment of an audio conference.

A first embodiment of the method from FIG. 2 relative to the case where the network 500 has substantially the architecture described with reference to FIG. 3. In FIG. 4, there is shown, by means of a time-space chart, the call flow required for establishing the audio conference (step 2002 from FIG. 2), in the case where the user of the first terminal 10 is the user "owner" or "originator" of the audio-conference.

It should be now observed that for the call flows described below, the name of the operations/steps/messages indicated is merely illustrative, and is to be intended as an aid for understanding the flows. A plurality of protocols can be actually used for implementing the service, both concerning speech (such as ISDN, VoIP protocols, etc.) and session/data sending control (such as http, SIP, proprietary protocols, etc.). The order in which the operations are carried out is to be considered as illustrative and explanatory, and not limiting.

The first terminal 10 (associated to the first user USER_A) sends (4001) a Conference Request to the Audio-Conference Server 80. This Conference Request can be activated by the first user USER_A by employing the keyboard of the first terminal 10 in accordance, for example, with one or more of these modalities: by sending a SMS, by connecting to a Web application, by activating a menu option of the software installed on the terminal, or by making a phone call to a service number. Advantageously, the Audio-Conference Server 80 can have default user lists (preferably, these lists will have a relative identification number) associated with each subscriber of the audio-data conference service, such that the invocation of the service is simplified.

By means of the Conference Request, the user USER_A indicates the identifiers $MSISDN_I$ of the users to be invited (or the identifier of the default list) and the conference establishment mode. Either an audio-conference establishment mode is possible, which is substantially immediate to the Conference Request, or a mode providing the reservation of the audio-conference at a time such as indicated in the Conference Request message.

The Audio-Conference Server 80 sends (4002) a Conference Request Confirmation Receipt to the first mobile terminal 10 and, furthermore, it sends (4003) to the Multicast Server 40 a message containing the numbers $MSISDN_I$ of the users involved ($MSISDN_A$, $MSISDN_B$, and $MSISDN_C$), the conference identification code $ID_C$. The Multicast Server 40, advantageously, stores these identification numbers in its memory.

The Multicast Server 40 responds by sending a confirmation message (4004) to the Audio-Conference Server 80. The communication between the Servers 40 and 80 can take place according to various techniques such as, for example, a proprietary interface or an http protocol. The operations 4003 and 4004 from FIG. 4 are an example of implementation of step 2003 of the method described with reference to FIG. 2.

According to the above example, the Audio-Conference Server 80 makes calls (4005) to the mobile terminals of each user (USER_A, USER_B and USER_C), thereby generating a corresponding Voice Call thereto. This Voice Call is identified by the particular conference service number $MSISDN_S$ and is followed by a Response to the Call (4006) by each user who is thus introduced in the audio conference (steps "A+B" and "+C").

The particular conference service number $MSISDN_S$ may be either a preset number (for example, 4555) or it can be formed by digits of a preset number followed by digits of an identifier $MSISDN_A$ of the originator or owner of the conference, i.e. according to the example, the first user USER_A, for example, $MSISDN_S=4555+MSISDN_A$.

Accordingly, the audio conference is established at the end of this procedure, and is illustrated in FIG. 4 by means of a black rectangular stripe. It should be noted that, for managing the audio of this conference, alternative technical solutions are possible, such as:

in the case where the Audio Conference Server 80 is provided with OSA interface, to GateWay Open Service Architecture (GW OSA), the functionalities of the MSC 36 are employed for the conference;

implementation of the Audio-Conference Server 80 on a Interactive Voice Response node (IVR) or Service Node, connected to the MSC 36 through ISDN/ISUP (ISdnUser Part).

In the example described above, all the terminals 10-30 have been considered as such to be operated for the audio-conference by means of the circuit subnetwork 200. It should be observed that, when one or more of the terminals 10-30 is such to allow a packet communication also for the audio conference, a conversion entity is provided (not illustrated in FIG. 3) which carries out a proper translation of the signalling messages and the traffic existing between the packet domain 100 and the circuit domain 200.

Figure 5:
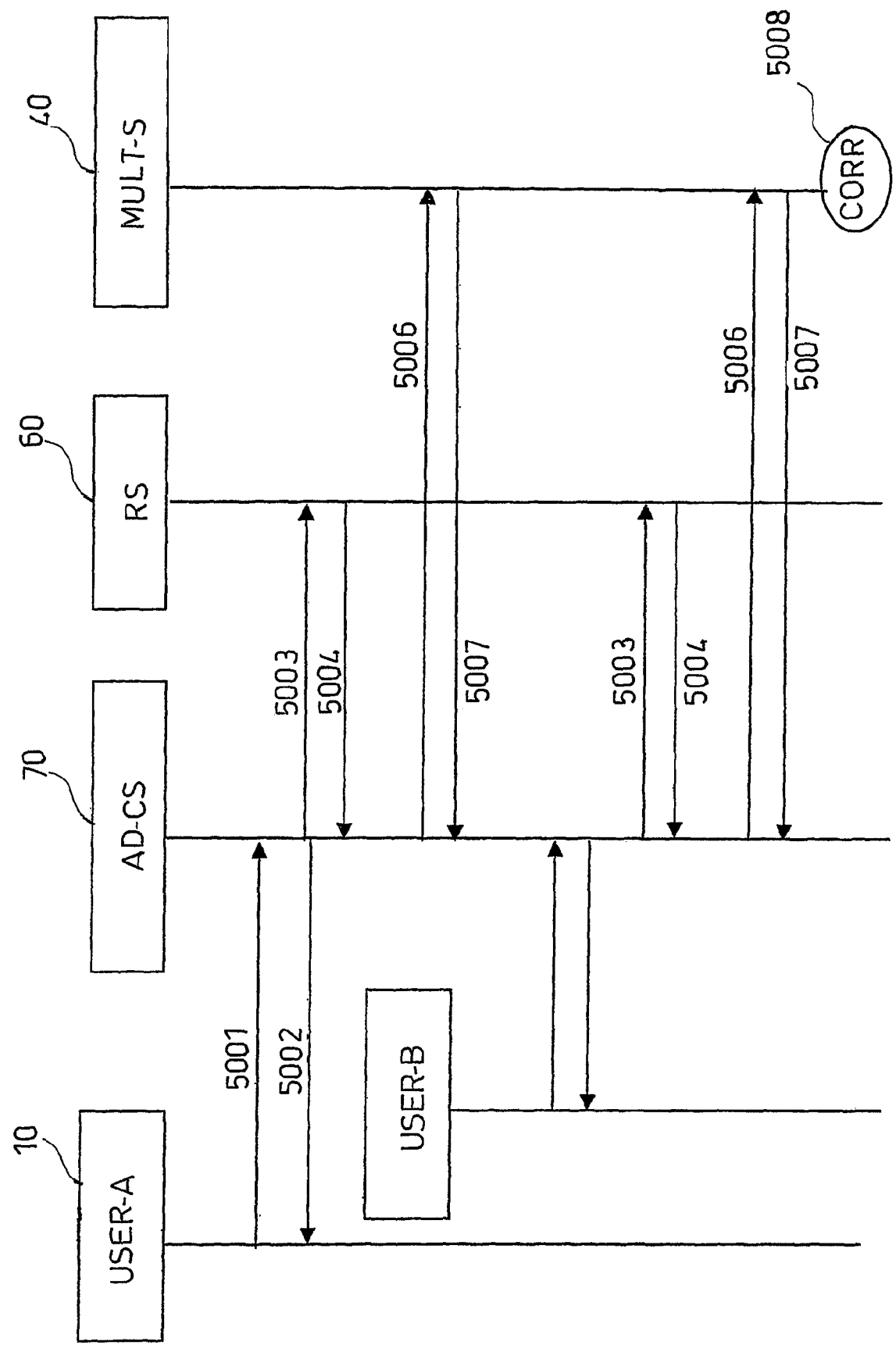
FIG. 5 illustrates an exemplary flow of signalling operations between mobile terminals and combinational service management entities which operate in the network from FIG. 3.

FIG. 5 illustrates in detail some of the operations included in the steps 2004, 2005 of the method from FIG. 2. Particularly, FIG. 5 relates to the interaction between the mobile terminals 10, 20 and 30, the Audio Data Server 70, the Radius Server 60 and the Multicast Server 40. Let us consider the steps 4005 and 4006 from FIG. 4, in which the software application managing the audio-data combinational service of the first mobile terminal 10 has received the Voice Call and has responded to this call.

For example, in a time subsequent to step 4006 and indicated in FIG. 4 with an asterisk * placed on the time axis of USER_A, this terminal 10 (or better, the software application thereof) activates a connection towards the packet subnetwork 100, advantageously automatically. On this connection, the first terminal 10 sends (Established Session Information message, 5001) the address IP_A of the terminal 10, and the identifier $MSISDN_S$, that is characteristic of the conference service from which it has received the call to the Audio Data Server 70.

The Audio-Data Server 70 responds (Established Session Response message, 5002) to the first mobile terminal 10 by indicating to the latter the port (P_A) of the first terminal 10 that the latter will have to use for being contacted in the subsequent steps.

The Audio-Data Server 70, retrieves the identifier $MSISDN_A$ of the first mobile terminal 10. To get this identifier $MSISDN_A$, the Audio-Data Server 70 queries (MSISDN Resolution Request message, 5003) the Radius Server 60 and provides the same with the address $IP_A$ of the first mobile terminal. The Radius Server 60, which has a correspondence between IP addresses and MSISDN identifiers for the active connections, sends this identifier $MSISDN_A$ to the Audio-Data Server 70 (MSISDN Resolution Request Response message, 5004). The Audio-Data Server 70 acknowledges that the call (5001) received by the first terminal 10 is of the "conference" type, because this call also has the identifier $MSISDN_A$, which is characteristic of the conference service. Then, the Audio-Data Server 70, sends (Session Participant Information message, 5006) the following information concerning the first terminal 10 to the Multicast Server 40:

the identifier $MSISDN_A$,
the address IP_A,
optionally, the identifier of the destination or listening port P_A,
optionally, a session identifier $S-ID_A$ (i.e. an identifier of the particular session established between the terminal 10 and the server 70).

The Multicast Server 40, confirms receipt of the above-mentioned information (step 5007) by means of a corresponding feedback message sent to the Audio-Data Server 70.

Furthermore, the steps indicated with references 5001 to 5007 are repeated such that, for the other terminals 20 and 30 involved in the conference, the same type of information as indicated above for the first terminal 10 is also sent to the Multicast Server 40.

Accordingly, the Multicast Server 40 also has the following information, i.e. the packet network identifiers and the circuit network identifiers of the other terminals 20 and 30:

with respect to second terminal 20 associated with the user USER_B: the identifier $MSISDN_B$, the address IP_B, the destination or listening port P_B, a session identifier $S-ID_B$ (i.e. an identifier of the particular session established between the second terminal 20 and the Audio-Data Server 70 that can have a portion in common with all the similar session identifiers that are associated with the participants in the audio-conference);

with respect to the third terminal 30 associated with the user USER_C: the address $MSISDN_C$, the address IP_C, the destination or listening port P_C, a session identifier $S-ID_C$ (i.e. an identifier of the particular session established between the third terminal 30 and the Audio-Data Server 70);

The Multicast Server 40 is capable of correlating the information received by the Audio-Data Server 70 with those previously received (step 4003) by the Audio Conference Server 80. Particularly, the Multicast Server 40 acknowledges the correspondence between the identifiers $MSISDN_B$ and $MSISDN_C$ of the users USER_B and USER_C that it has received from the Audio Conference Server 80 (in step 4003) with those that it has received from the Audio-Data Server 70 (in step 5006) and associates the same to the conference identification number $ID_C$ (step of Identifier Correlation and Storage 5008—CORR-, of FIG. 5). The correlation step 5008 is an example of the step of association to the same combinational service 2006 from FIG. 2.

Figure 6:
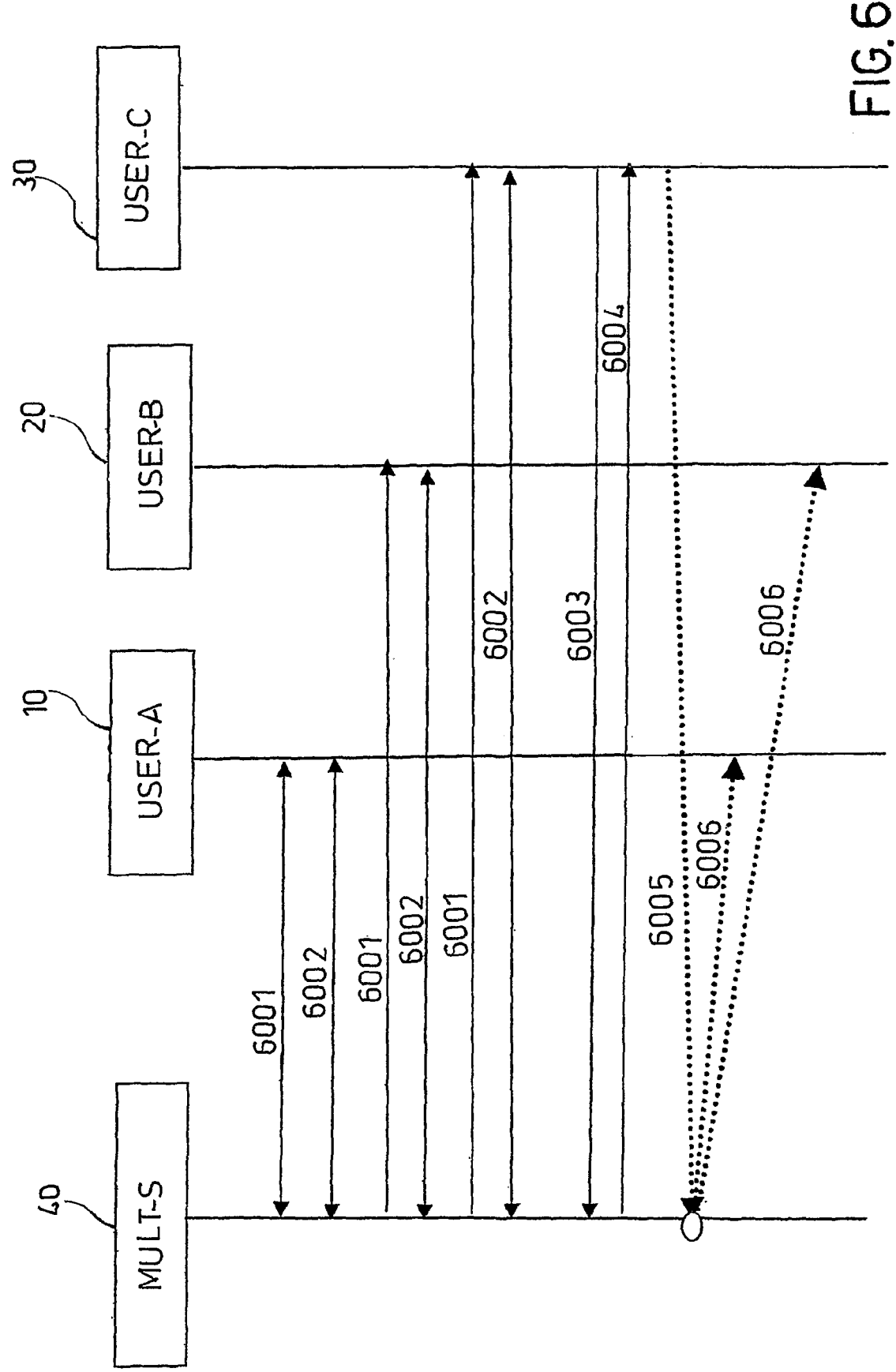
FIG. 6 illustrates an exemplary flow of operations concerning the establishment of a data conference in the network from FIG. 3.

FIG. 6 relates to a particular embodiment of the steps 2004 to 2007 which have been described above with reference to FIG. 2 and details the signals exchanged between the Multicast Server 40 and the terminals 10-30 of the users. The Multicast Server 40 contacts, by means of a packet connection, the users involved on the port $P_I$ that has been concordated for each of them, and sends them the respective session identifier S-ID and its own address $IP_{SM}$ (step of Data Session Establishment, 6001), through which the Multicast Server 40 presents itself to each terminal 10-30 as a peer on the packet connection. The terminals of the users USER_A, USER_B and USER_C confirm receipt of the information.

It should be noted that, before contacting the users involved by means of the signallings 6001, the Multicast Server 40 waits to receive (in step 5006 from FIG. 5) from the Data-Audio Server 70 the identifiers of at least two conference users (such as to ascertain that at least two users are able to send/receive data).

Furthermore, optionally, the Multicast Server 40 and each user may negotiate a suitable port $P_I$ for transmitting and sending data both for the mobile terminal, and the Multicast Server (steps of Port Renegotiation, 6002).

When a user (such as the user USER_C) desires to send data to be shared with the other user, he sends a transmission request (step of Transmission Request, 6003) to the Multicast Server 40. Advantageously, in the case where a Multicast Server 40 receives more Transmission Requests (6003) at the same time, it is capable of managing these collision events by giving or denying permission for transmission.

The terminal of the user authorized to transmit (such as, for example, the user USER_C associated with the third mobile terminal 30) receives an authorization message (OK to Transmission, 6004) and sends the data (such as images, files or other types of data) to the Multicast Server 40 (step of Multicast Data Sending, 6005) on a packet connection. The Multicast Server 40 replicates these received data and sends them to the other users participating in the audio-data conference.

The sending of these data takes place on a packet connection employing the packet subnetwork 100 and makes use of the packet network identifiers such as the IP address of the respective user and the respective port. The Multicast Server 40 has the required identifiers and, thus, it retrieves them, since they have been stored in the Server 40 itself (step 5008, FIG. 5) and agreed in the above-mentioned steps 6001-6002. The format of the data sent/received during the data session is agreed (either a priori or before transmission) between the Multicast Server 40 and each mobile terminal 10-30.

Furthermore, the data sent by the mobile terminal 30 may be memory resident in the mobile terminal 30, or they can correspond to live recordings carried out by the devices with which the mobile terminal is provided (such as the photocamera 126). The Multicast Server 40 receives the data, replicates the content thereof and transmits the same (6006) to other users, USER_A and USER_B.

The Multicast Server 40 and the mobile terminals 10-30 are provided with softwares adapted to implement the suitable functionalities for handling the data, both sent and received. In particular, the mobile terminals to which the data are destined may, for example, show on the display 128 (FIG. 19) the images received, which may have been recorded by the video camera 126 with which the third terminal 30 is advantageously provided.

The methodology described with reference to FIG. 6 relates to the particular case where all the participants in the audio conference also participate in the data conference, but the inventive method of enabling an audio-video conference can also provide the case where not all the participants in the audio conference also participate in the video conference. For example, at least a further user (not illustrated) can participate in the audio conference (by completing the steps 5001 to 5002 from FIG. 5) but not participate in the video conference. For this further user, the Audio-Data Server 70 will not send to the Multicast Server 40 those identifiers that have been sent for the other users with operations 5006 and 5007 (FIG. 5). Consequently, the Multicast Server 40 will not send the data received in step 6003 (FIG. 6) to the further user that has been excluded from the data conference, and will send them only to the users USER_A, USER_B and USER_C (operations 6006).

The non-participation of this further user to the data conference may be due, for example, to the fact that the user employs a terminal which is not enabled for managing the involved data (such as a video).

To manage this situation, it is possible to provide that the operations 6001 from FIG. 6 (by means of which the Multicast Server 40 contacts those user terminals of which it has received the identifiers required in operation 5006), are carried out at the end of a preset time interval being evaluated from, for example, the end of each identifier sending operation (operations 5006, FIG. 5). Accordingly, if at the end of this time interval a further sending of data relative to other users has not occurred, the Multicast Server 40 carries on to establish the sessions as described with reference to the operations 6001 from FIG. 6 only for the users of which it has been informed.

Still referring to what has been discussed above with regard to the operations carried out for establishing the data conference and schematically illustrated in FIG. 6, it may also be provided that, advantageously, the Multicast Server 40 communicates (by means of operation 6001), the list of the participants in the audio-data conference (i.e. a list of the respective MSISDN identifiers) to all the users from which it has received a confirmation, with information on the characteristics or capabilities of the terminals 10-30. Information concerning the capabilities can be sent from each terminal, for example, during a step in replacement of or in addition to step 6002 from FIG. 6.

These sent capabilities can be, for example, a type of information allowing the Multicast Server 40 to identify those users participating only in the audio conference, as well as those users having terminals that are also enabled to the data conference. Optionally, the capabilities sent to the Multicast Server 40 may contain other information which describes the capabilities of the terminal enabled for the data conference such as, for example, the possibility of supporting only videos, or supporting the video together with functionalities of sending/receiving files/documents. By receiving the list of participants and the respective capabilities, all the users having terminals enabled for the data component may be informed on the traceability of the individual users for data interactions. Advantageously, in the case of an address book being available on the terminal, the list of identifiers MSISDN$_I$ can be displayed by using the name or "alias" contained in the address book.

Figure 7:
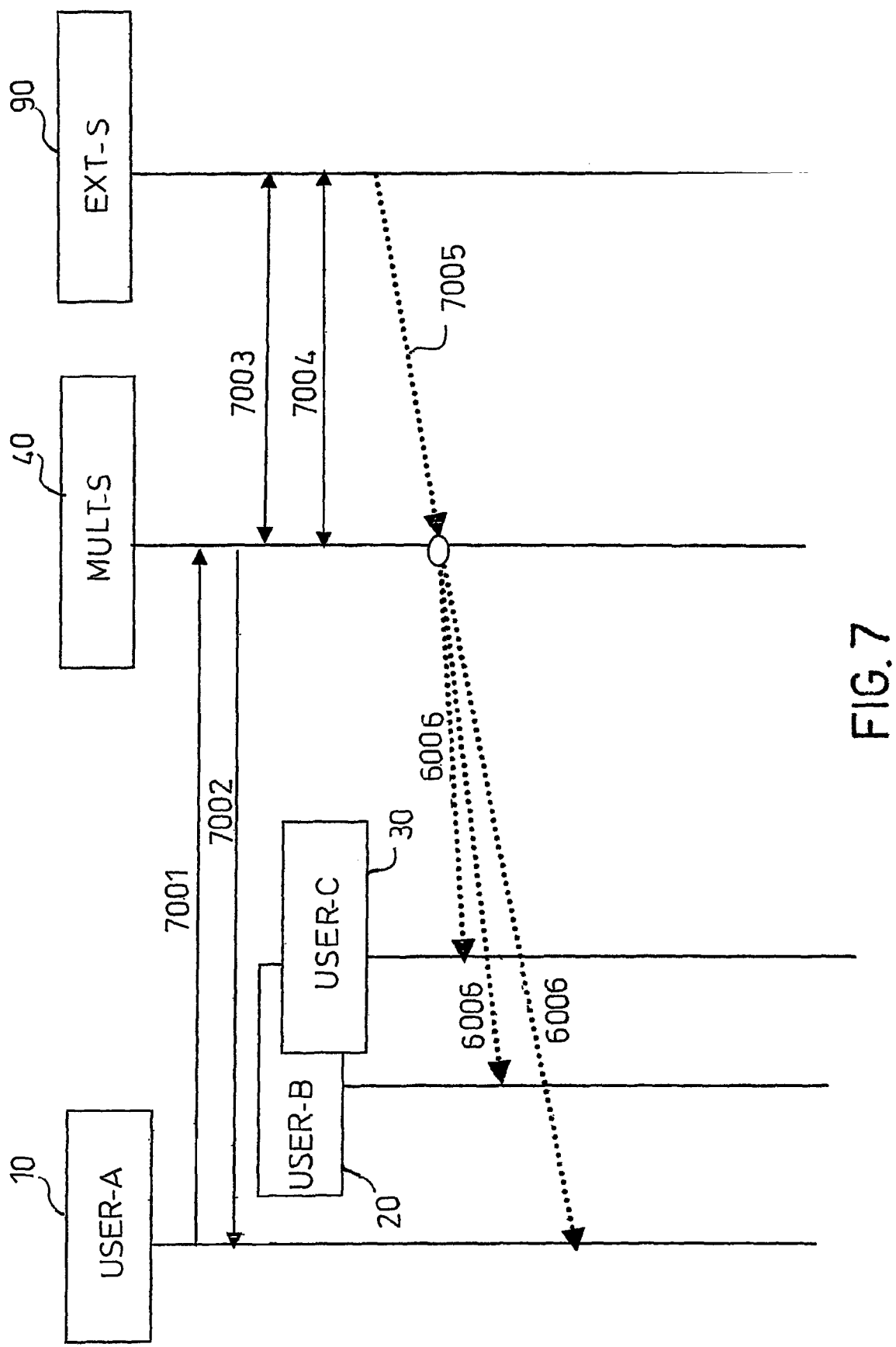
FIG. 7 illustrates an exemplary flow of operations concerning the establishment of a data conference in the network from FIG. 3 in the case where these data are provided by an entity other than said terminals.

FIG. 7 relates to a further case where the data that the first user USER_A desires to share with the other users do not reside in the first terminal 10, but they are requested by an External Server 90 associated, for example, with the external packet network 56. In this case, the first terminal 10 sends 40 a request message for retrieving data from the outside (step of Request of Retrieval of Contents from the Outside, 7001) to the Multicast Server. The Multicast Server 40, after it has confirmed this request (step of Request Confirmation, 7002), establishes a data session (by means of a packet connection) with the External Server 90 (step of Data Session Establishment, 7003). Subsequently, an optional negotiation of ports $P_I$ can take place between the Multicast Server 40 and the External Server 90 (step of Port Renegotiation, 7004) to which there follows the sending of data from the External Server 90 to the Multicast Server 40 (step of Data Sending, 7005). The Multicast Server 40 replicates these data and distributes the same to the terminals 10-30 (step of Multicast Data Sending, 6006).

Figure 8:
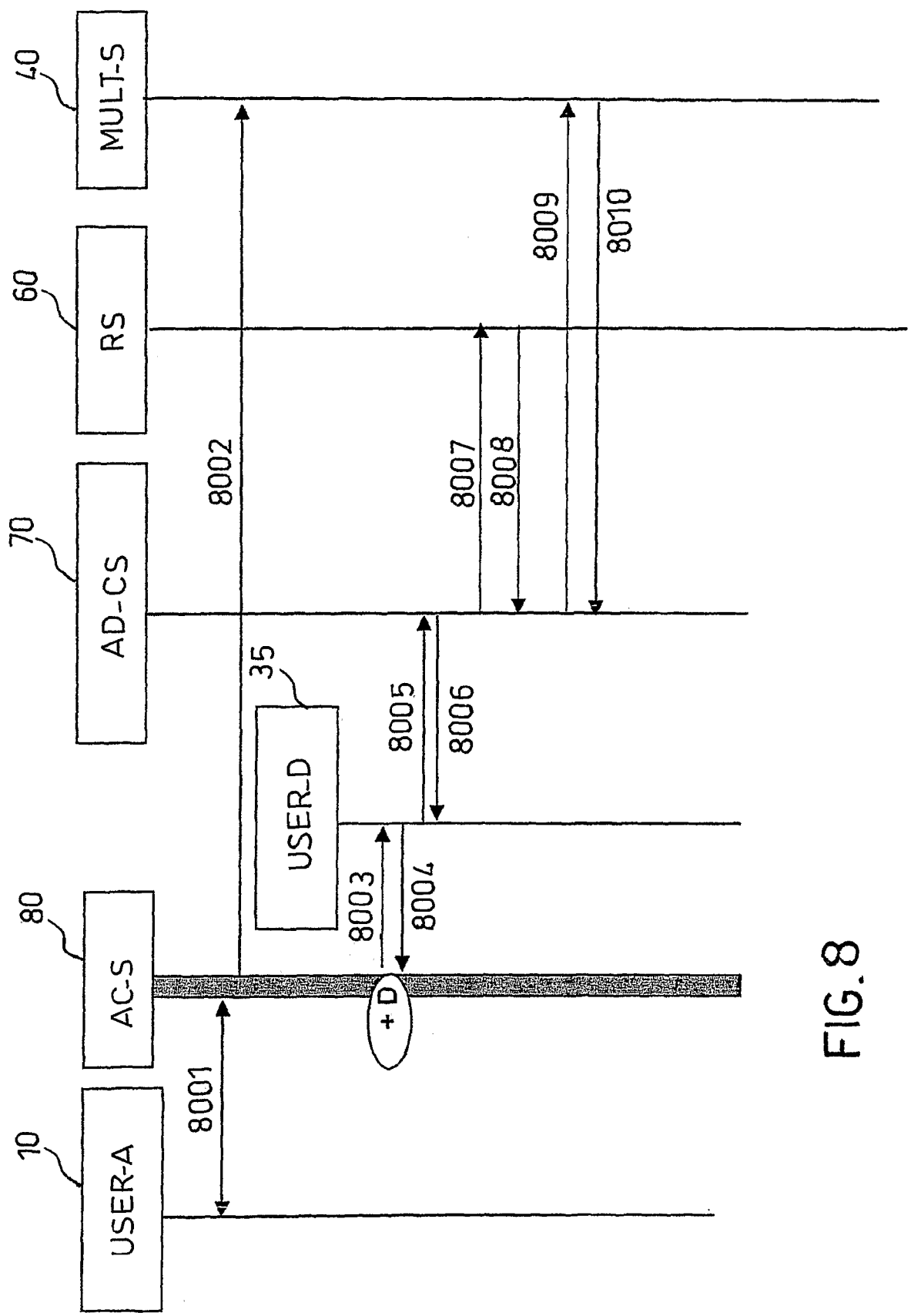
FIG. 8 and FIG. 9 illustrate exemplary flows of signalling messages in the network from FIG. 3 where a mobile terminal is either added or removed, respectively.
Figure 9:
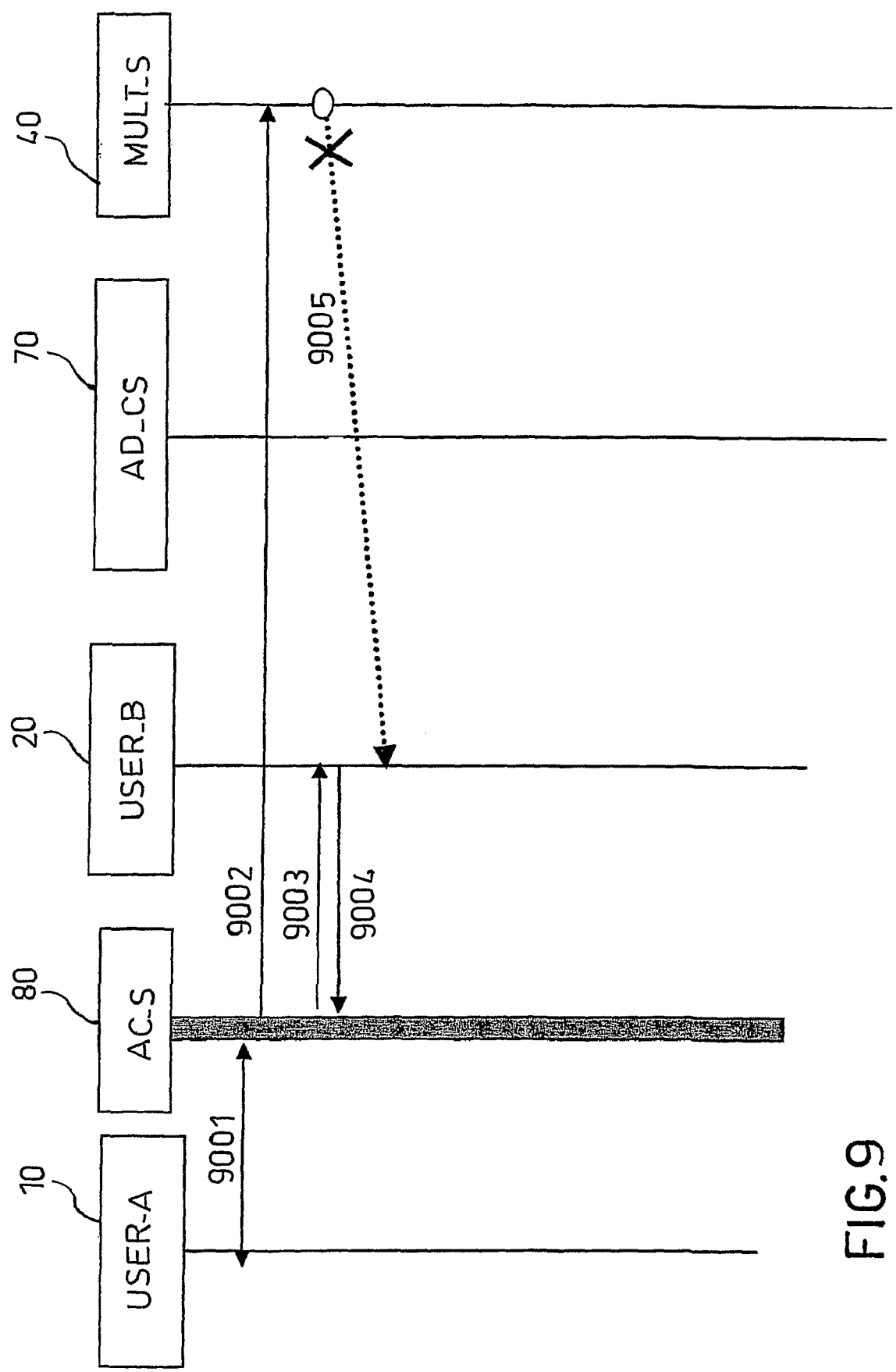

Advantageously, the network 500 is capable of also managing events like the insertion of a new user in the already established audio-data configuration (FIG. 8) and the removal of a user (FIG. 9). With reference to FIG. 8, one of the users already inserted in the conference (for example, the user USER_A, owner) sends a request message to the Audio Conference Server 80 for the joining of the new user (step of New User Joining Request, 8001). This request message can either be sent via SMS, via Web application or by means of a software residing in the mobile terminal of the requesting user. Furthermore, the request message from step 8001 includes the conference identifier $ID_C$, and the telephone number $MSISDN_D$ of the new user USER_D associated with a respective terminal 35, such as a mobile terminal.

Based on these identifiers, the Audio-Conference Server 80 sends (step of Audio Conference Update, 8002) the telephone number $MSISDN_D$ of the new user USER_D to be inserted together with the conference identifier $ID_C$ to the Multicast Server 40. Subsequently, the Audio Conference Server 80 makes a telephone call (8003) and contacts the new user USER_D who, by responding to the call (8004), joins the audio-conference (step +D).

The new user USER-D contacts the Audio Data Server 70 (similarly to step 5001 from FIG. 5), and sends (step of Information on Established Session, 8005) the address of the mobile terminal of this user (address IP_D) and the identifier $MSISDN_S$ characteristic of the conference service from which he has received the call to the latter. The Audio-Data Server 70 responds (message of Established Session Response, 8006) to the mobile terminal of the new user USER_D, and provides the same with the port (P_D) of the mobile terminal that the latter will have to use to be contacted in the subsequent steps. The steps 8007 to 8010 are similar to the steps 5003 to 5007 described above with reference to FIG. 5 and allow the Multicast Server 40 to be provided with the communication identifiers required for the new mobile terminal to be also contacted on packet connection 35.

Advantageously, similarly to what has been discussed with reference to FIG. 6, also with reference to the new user USER_D, there may be provided further operations of sending an updated list of the users participating in the audio-data conference, and the capabilities of USER-D to all the video/data conferencing terminals. The new user USER_D is thus registered in the audio/data conference service and will thus be able to participate in the data sharing similarly to what has been described with reference to FIGS. 6 and 7 for the other users.

FIG. 9 relates to the case of a user removal, for example, the second user USER_B. The first user USER_A of the first terminal 10 sends a request for removing the user USER_B (or more users) from the established audio-video conference (step of User Removal Request, 9001) to the Audio Conference Server 80. This request (9001) is sent similarly to what has been described in step 8001 from FIG. 8 and contains the identifier (MSISDN$_B$) of the user USER_B. The Audio-Conference Server 80 sends a message containing this identifier MSISDN$_B$, the removal request and the conference identifier ID$_C$ to which the request is referred (step of Conference Information Update, 9002) to the Multicast Server 40. Furthermore, the Audio-Conference Server 80 provides to the release (step of Release, 9003 and Release Completion 9004) of the circuit connection that telephonically connects the user USER_B to the audio-conference. The removal of a user from the audio-data conference may also be originated by the user himself, who does not desire to user the service any longer.

The Multicast Server 40, following the receipt of the information contained in the message in step 9002, will provide to cancel the user USER_B from the list of participants in the audio-data conference. In the case where the Multicast Server 40 receives the message 9002 when data are being transmitted, the following applies:

if the user USER-B is receiving the data, the data (packet) connection towards this user is released (step of Data Connection Release, 9005). For example, to perform this release, the software application of the second terminal 20, following a signalling by the Multicast Server 40, makes its port P_B, which is used for receiving the data, no longer available for this operation;

if the user USER-B is transmitting the data, the data connections towards the user to be removed and the receiving users are closed. For example, the Multicast Server 40 sends signalling messages, to the user to be removed and the other users, following which the second terminal 20 makes its port P_B no longer available for transmitting further data and the other terminals 10 and 30 make the respective ports P$_I$ not available for receiving the data transmitted by USER_B.

After the user has been removed, an optional message to all the users taking part to the audio-data conference allows updating the list of the participants enabled to the conference. In the case where, after one or more removals, only one user can participate in the data conference, the data send/receive functionalities will be disabled until a further terminal logs in, which is provided with these functionalities.

A second embodiment of the method from FIG. 2 will be now described, which relates to the case where the network 500 (particularly the packet subnetwork 100) comprises an IP Multimedia Subsystem (IMS) network infrastructure. The IMS technology has been provided for allowing communications which are completely based on the IP Internet Protocol, and thus using the benefits of the IP protocol for every kind of network connectivity. In particular, the IMS technology allows the mobile network operators to offer services based on Internet applications (i.e. of a packet type) to their subscribers. The IMS core network, which is described for example within the Third Generation Partnership Project (3GPP) specification TS 23.228, allows access to voice, messages, images, data, web technologies for wireless system users, thereby combining the opportunities offered by the Internet with those offered by mobile communications. A signalling protocol used in the IMS network for combining circuit and packet communications is the Session Initiation Protocol (SIP).

The structure of network 500 described with reference to FIG. 3 can also be used when the IMS technology is employed, except for the following differences indicated with reference to FIG. 10 that schematically shows the entities, or particularly, the servers of network 500 that interact to manage the audio-data conference when an IMS architecture is employed. In addition to the above entities, such as the Audio Conference Server 80 (included in the circuit subnetwork 200) and the Radius Server 60 (of the IMS type, in this case), the network 500 comprises an IMS Core Network 110 (C-IMS), to be considered as being included in the packet network 100.

Figure 10:
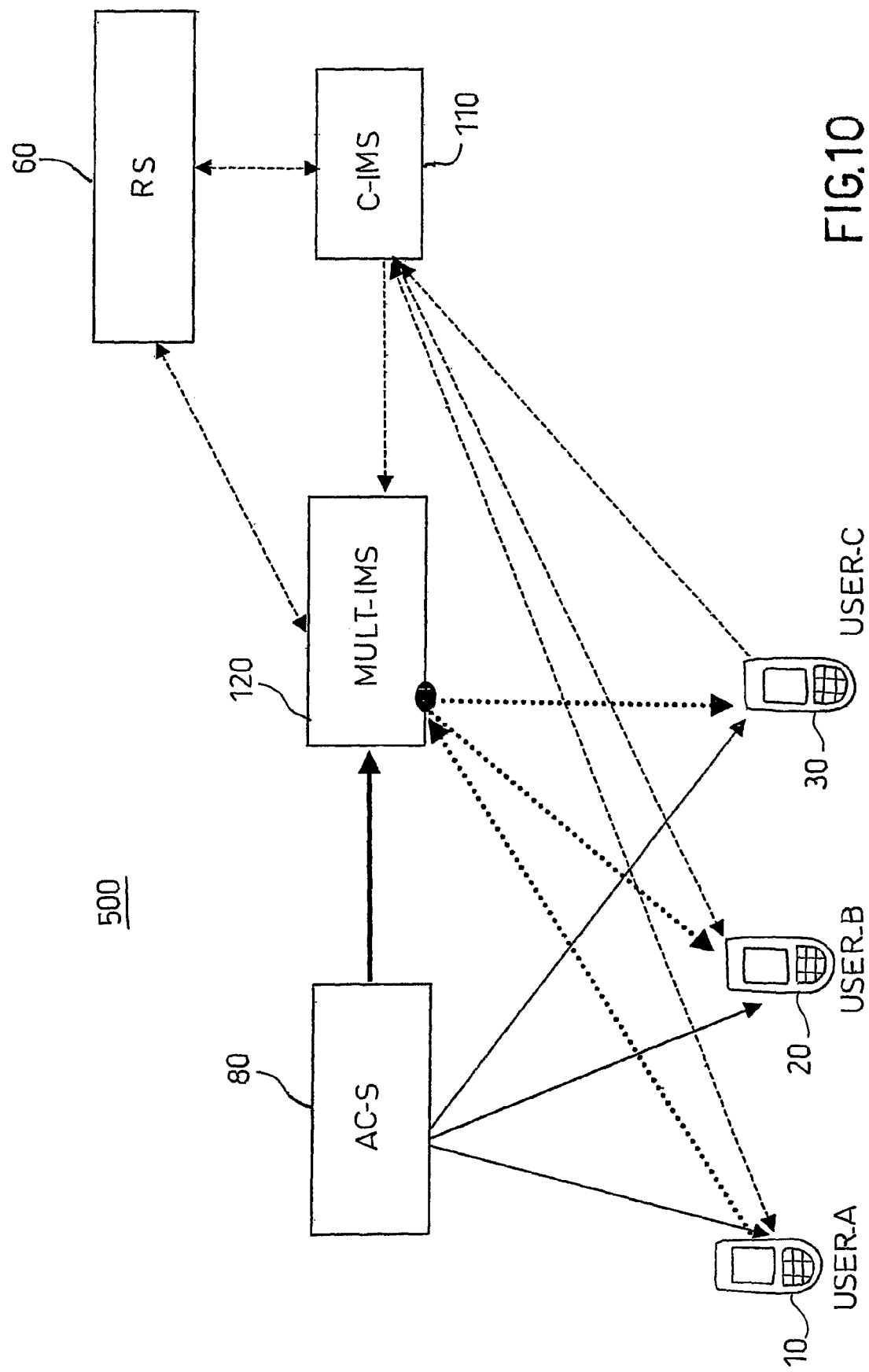
FIG. 10 illustrates, schematically and by functional blocks, a portion of a second embodiment of the network from FIG. 1 made according to the IMS architecture.

Those functionalities that in the embodiment described with reference to FIG. 4-9 are relied to the Multicast Server 40 and the Audio Data Server 70, are implemented, according to this other embodiment, by an entity based on IMS technology such as a Multicast-Audio-Data Server 120 (MULT-IMS), which is schematically illustrated in FIG. 10. The Multicast-Audio-Data Server 120 can be provided by means of an Application Server apparatus (AS) having control functions in IMS technology.

In FIG. 10 there are indicated the signals exchanged between the several entities with the following symbols: with a solid line there are illustrated the voice signals (being the subject of the audio conference), with dash lines there are represented the signalling messages (such as SIP signals) and with dotted lines there are indicated signals carrying the data (subject of the data conference). The continuous and thick line illustrated in FIG. 10 between the Audio Conference Server 80 and the Multicast Audio-Data Server 120 does not indicate voice signals, but relates to signalling messages exchanged between these servers according to several possible technologies; such as a proprietary interface or an http protocol.

Figure 11:
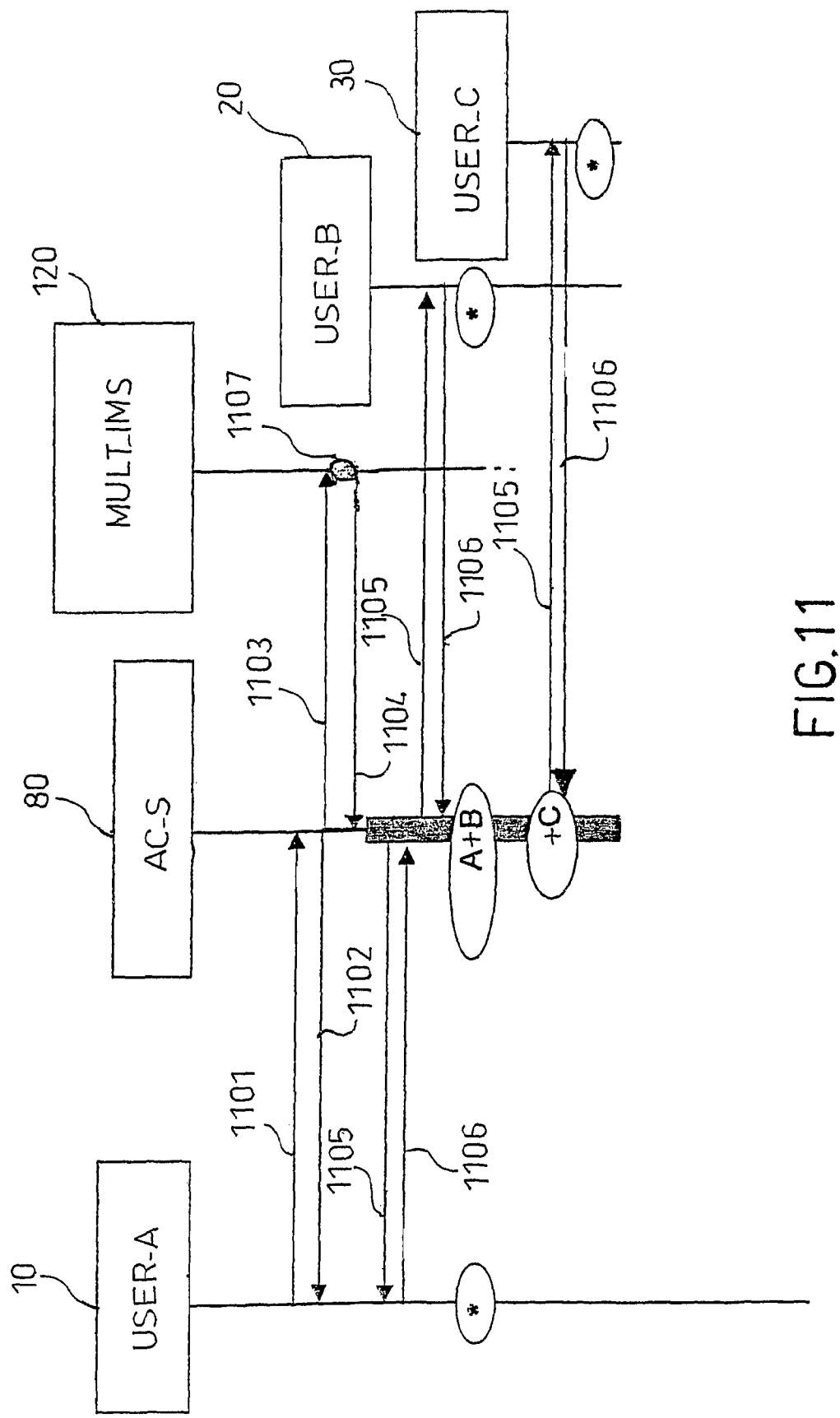
FIG. 11 illustrates an exemplary flow of operations concerning the establishment of an audio conference in the network from FIG. 10.

In FIG. 11 there is shown, by means of a time-space diagram, the call flow required for establishing the audio conference, in the case where the user of the first terminal 10 is the audio-conference owner user.

It should be observed that for the call flows described below, the name given to the operations is merely indicative, and is to be intended as a support for understanding the flows. There may be a plurality of protocols actually used for implementing the service. With regards to the voice, ISDN protocols or VoIP protocols, for example, may be used. The session control and data sending utilizes the IMS architecture, and the signalling for establishing the data sessions employs the SIP protocol. Furthermore, it should be noted that the order in which the operations are performed is to be considered as merely illustrative.

Referring back to FIG. 11, the first terminal 10 sends (1101) a Conference Request to the Audio Conference Server 80. This Conference Request can be activated by the first user USER_A by means of his own keyboard in accordance with, for example, one or more of these modes: sending a SMS, connecting to a Web application, running a software installed in the mobile terminal, making a telephone call to a service number. Advantageously, the Audio Conference Server 80 can be provided with the above-mentioned default user lists which are associated with each subscriber of the conference service. By means of the Conference Request, the user USER_A indicates the identifiers $MSISDN_I$ of the users to be invited (or, the default list identifier) and the establishment mode (such as an immediate, or booked in advance conference).

The Audio Conference Server 80 sends (1102) a Conference Request Confirmation Receipt to the first mobile terminal 10 and, furthermore, it sends (1103) to the Multicast Audio-Data Server 120 a message containing the numbers $MSISDN_I$ of all the users involved (USER_A, USER_B, and USER_C) and the conference identification code $ID_C$, which, advantageously stores these identifiers (step 1107). The Multicast Audio Data Server 120 responds by sending a confirmation message (1104) to the Audio Conference Server 80. The step 1103 of sending the identifiers $MSISDN_I$ and $ID_C$ to the Multicast Audio-Data Server 120 is another example of step 2003 from FIG. 2.

According to the example described, the Audio Conference Server 80 makes calls (1105) to the mobile terminals of each user by generating a corresponding Voice Call to them. This Voice Call is identified by the specific service number of the conference $MSISDN_I$ (for example, #4555 or #4555 followed by the MSISDN identifier of user USER_A, being the organizer of the conference, and is followed by an Answer to the Call (1106) of each user which is thereby inserted in the conference. At the end of this procedure, the audio conference is thus established. The modalities of establishing the audio conference described above are an exemplary embodiment of step 2002 from FIG. 2.

For managing the audio of this conference, various types of technical solutions are available, for example those described with reference to FIG. 4.

Figure 12:
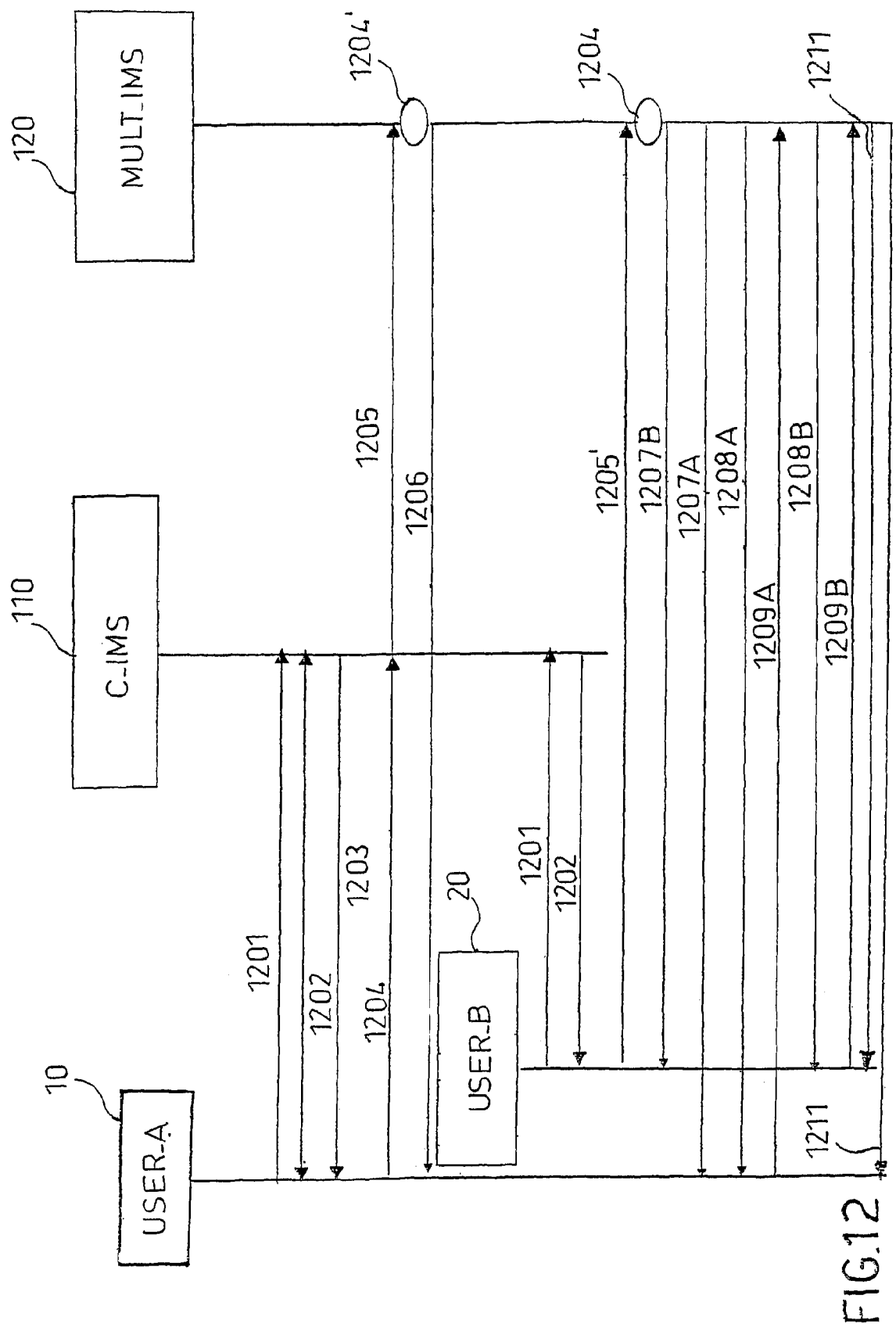
FIG. 12 illustrates an exemplary flow of signalling operations between mobile terminals and combinational service management entities which operate in the network from FIG. 10.

In FIG. 12 there are indicated several operations included in steps 2004, 2005 of the method from FIG. 2. In particular, FIG. 12 relates to the interaction between the mobile terminals 10-30, the IMS Core Network 110 and the Multicast Audio-Data Server 120, in relation with the signalling operations preceding the establishment of the data conference.

Let us consider the steps 1105 and 1106 from FIG. 11, in which the software application managing the audio-data combinational service of the first mobile terminal 10 has received the Voice Call and has sent an Answer to the Call to the Audio Conference Server 80. For example, in a time subsequent to step 1106 and indicated in FIG. 11 with an asterisk * placed on the time axis of USER_A, this terminal 10 (or better, the software application thereof) activates, advantageously in an automatic manner, the procedure for establishing a data connection (to the packet network 100) on which it sends a request of registration (1201) into the IMS Core Network 110 in accordance with the SIP protocol (REGISTER message).

The IMS Core network 110 carries out, in a manner known per se, an authentication of the first user USER_A.

Particularly, the IMS Core Network 110 can send to the first terminal 10 a registration-refusal response (for example, a response such as 401-Unauthorized, according to the SIP protocol) and request (message 1202) to the first mobile terminal 10 other credentials for registration. If the authorization step is successful and the user is acknowledged, the IMS Core Network 110 sends a registration-accepted response (1203) such as a message 200 OK of SIP protocol.

The REGISTER message (1201) contains communication packet-network identifiers enabling the IMS Core Network 110 to acknowledge the first user USER_A. These identifiers are, for example, the URI of the first user (URI_A) and the address IP_A. As will be appreciated by those skilled in the art, the URI (Uniform Resource Indicator) is a packet connection identifier that is employed by the SIP protocol and, in this instance, it may be in various formats.

For example, this URI may be either of the name@domain type, where the "name" is the user MSISDN or a generic alias (for example, an alphanumeric string) being associated with the MSISDN may be used. In any case, the user is registered in a network database (for example, residing in a Home Subscriber Server (HSS), that is possibly associated with the Radius Server 60) or in application databases. By accessing these databases, the IMS Core Network 110 can retrieve the correspondence between the URI and the user MSISDN identifier. Furthermore, the IMS Core Network 110 can retrieve the MSISDN identifier of the user in question, also starting from his IP address, by querying the Radius Server 60 which stores the IP-MSISDN correspondence for the packet connections of the mobile network.

Subsequently to the registration step (1201-1203), the first user USER_A provides to send a message 1204 (OPTIONS message, according to the SIP protocol) to the IMS Core Network 110 with which it requests to be informed on the capabilities of the data concerning the data conference that the Multicast Audio Data Server 120 is capable of managing. For example, these characteristics can be the data format type such as, for example in the case of image sharing, the typology of compression of the latter (JPEG or MPEG compression).

The OPTIONS request message (1204) sent to the IMS Core Network 110 contains as the "sender" field (field "From") the identifier URI_A of the first user and as the "addressee" field (field "request-URI") the address of the Multicast Audio-Data Server 120. Thereby, the IMS Core Network 110, after it has received the OPTIONS message, forwards the same to the Multicast Audio-Data Server 120. It should be noted that the communication between the mobile terminals 10-30 and the Multicast Audio-Data Server 120 takes place through the IMS Core Network 110 but, for clarity reasons, in the following there will be described messages sent/received to/from the mobile terminals and directly sent/received to/from the Multicast Audio-Data Server 120; the description of the IMS Core Network 110 intervention will be omitted. Upon receipt of the OPTIONS message (1205), the Multicast Audio-Data. Server 120 responds to the first terminal 10 with a WAIT message 1206 (i.e. a 100 Trying message, in the SIP protocol). During this waiting time, the Multicast Audio-Data Server 120 waits to receive further OPTIONS messages from the other mobile terminals 20 and 30.

Furthermore, the Multicast Audio-Data Server 120 retrieves (step 1204') the identifier $MSISDN_A$ of the first user USER_A that has sent the OPTIONS message. The retrieval of the identifier $MSISDN_A$ can take place from the same OPTIONS message that has been received if the latter contains, either in the >From field, or in another field of the message itself, this MSISDN identifier. Alternatively, the identifier $MSISDN_A$ can be retrieved from the address IP_A, provided by the OPTIONS message, and by querying the Radius Server 60, or by querying a network node where the profiles associated with the users are provided.

The second terminal 20, associated with the second user USER_B, carries out its registration by exchanging with the IMS Core Network 110 and the Multicast Audio-Data Server 120 similar messages as those referred above with 1201, 1202 and sends its "capabilities" request by means of a respective OPTIONS message (1205'). The third terminal 30 associated with the USER_C (not shown in FIG. 12) operates in a similar manner. The OPTIONS messages sent by the other terminals contain, among other possible identifiers, the URI and the IP address of the respective user.

Upon receipt of the second OPTIONS message (1205'), the Multicast Audio-Data Server 120 provides to send to the two involved terminals from FIG. 12, USER_A and USER_B (and to the terminal associated with the USER_C, not shown in the figure), a respective message of request confirmation receipt 1207A and 127B (i.e. the message 200 OK) that further contains the characteristics or capabilities of the data that can be managed by the Multicast Audio-Data Server 120.

Similarly to what has been stated above concerning the retrieval of the identifier $MSISDN_A$ of the first user USER_A, the Multicast Audio-Data Server 120 also retrieves (further step 1204') the identifiers $MSISDN_B$ and $MSISDN_C$ of the other two terminals associated with USER_B and USER_C. Furthermore, the Multicast Audio-Data Server 120 stores the MSISDN-URI correspondence for each user involved in the audio conference. The steps of sending the OPTIONS messages (1205 and 1205') are an exemplary embodiment of the steps 2004, 2005 from FIG. 2, with which the establishment of a data conference is requested and the identifiers $URI_I$ (i.e. a type of packet network identifier) of the users involved are provided to the Multicast Audio-Data Server 120. The steps 1204' concerning the retrieval of the identifier $MSISDN_I$ of each user, which are carried out according to the example based on the URI identifier or IP address, are a possible embodiment of the association step 2006 from FIG. 2.

Furthermore, the Multicast Audio-Data Server 120 sends to the users involved (USER_A and USER_B in FIG. 12) a respective message (OPTIONS messages 1208A and 1208B) with which it requests the capabilities of the data that can be managed by each terminal.
The two mobile terminals queried respond to the Multicast Audio-Data Server 120 with two respective messages 1209A and 1209B by sending the information concerning the capabilities to be managed. The terminals participating in the audio-data conference may have different capabilities from each other (for example, they may support different image compression algorithms), consequently the Multicast Audio-Data Server 120 may be required to make an adaptation or conversion of the formats in which the data should be sent to each terminal. To the purpose, the Multicast Audio-Data Server 120 stores this information concerning the capabilities of each mobile terminal 10-30 in a suitable memory.

According to a preferred embodiment, the Multicast Audio-Data Server 120 communicates (step 1211 from FIG. 12) to all the user terminals from which it has received a response (1209A e 1209B) to the OPTIONS requests that have been sent, a participant list such as a list of MSISDN, URI SIP identifiers, and optionally, the capabilities of the terminals. This step 1211 can take place in different ways, such as the event subscription supported by the SIP protocol (SUBSCRIBE/NOTIFY methods) or by means of other mechanisms/protocols (for example, the Hyper Text Transfer Protocol (HTTP)).

It should be observed that, advantageously, step 1211 is repeated (with updated lists or messages notifying the presence of new users) at each subsequent response by terminals to the OPTIONS request that has been sent by the Server MULTI_IMS 120 and provides an interaction to all the terminals that have responded (1209A and 1209B) to the OPTIONS request that has been sent. Furthermore, it may be provided that the first list-sending step (1211) takes place only after at least two terminals have responded to the OPTIONS request by means of steps 1208A and 1208B.

Figure 13:
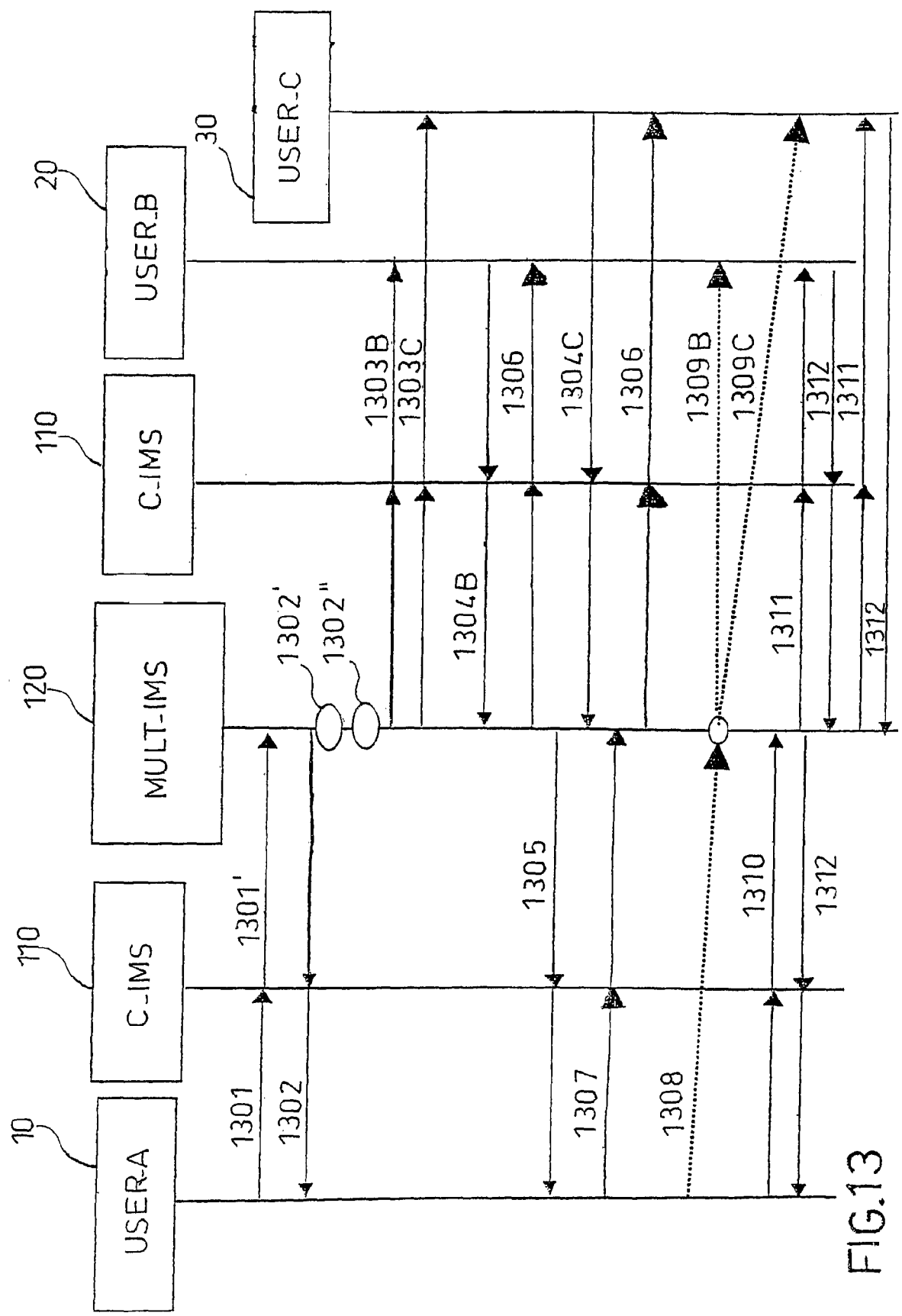
FIG. 13 illustrates an exemplary flow of operations concerning the establishment of a data conference in the network from FIG. 10.

In FIG. 13 there are indicated for the IMS technology, the operations of network 500 concerning the steps of establishing the data conference 2007 described with reference to FIG. 2. In this example, let us suppose that the first user USER_A desires to send data to the other users involved in the conference. The first mobile terminal 10 sends to the IMS Core Network 110, upon command by the respective user, a message (1301) with which it declares the intention of transmitting data (INVITE message, according to SIP protocol). The INVITE message (1301) carries the following packet-network identifiers:

- a request-URI (addressee field) such as "conference_number@domain", where the "conference_number" is the conference specific service number $MSISDN_S$ and from which the users have received the voice call;
- its own URI (URI_A), in the field From according to SIP protocol, i.e. the "sender" field;
- the description of the session in the Session Descriptor Protocol (SDP) of SIP protocol, comprising the following information: the port P_A of the first terminal 10, the address IP_A of the first terminal 10, information concerning the data to be transmitted, such as codings used, bit/rate used, type of media and/or the like. It should be noted that the message 1301 is another example of the step of Conference Establishment Request 2004 from FIG. 2, particularly in the case where OPTIONS messages are not exchanged for exchanging the capabilities between the terminals involved in the conference and the Multicast Audio-Data Server 120.

The IMS Core Network 110, acknowledges (according to the number $MSISDN_S$) that the request-URI (1301) is associated with the audio-data conference service, and forwards (1301') this request to the Multicast Audio-Data Server 120. Advantageously, the Multicast Audio-Data Server 120 manages any collision events that may occur (more users request permission to transmit at the same time) and either grants or denies the authorization to transmit; when the request is accepted it responds to the INVITE message (1301') with a wait response (i.e., such as 100 Trying, 1302).

It should be observed that in the case where there are terminals which have not participated in the OPTIONS exchange (steps 1205 and 1205' from FIG. 12), for example, because they are not enabled to this procedure, when the Multicast Audio-Data Server 120 receives the INVITE message (1301') does not know the correspondence between the identifiers $URI_I$ and the identifiers $MSISDN_I$. In this case, other procedures for retrieving the identifiers $URI_I$ and associating the latter with the respective identifiers MSISDNi are carried out, which are described herewith below, by way of example.

The Multicast Audio-Data Server 120 retrieves, if this has not already been done before, following the OPTIONS message (steps 1205 and 1204' from FIG. 12), the MSISDNA identifier of the first user, i.e. the user who sent the request. The identifier $MSISDN_A$ can be retrieved from the INVITE message 1301' that has been received, if the latter contains, in the field From, this MSISDN identifier. Alternatively, the identifier $MSISDN_A$ can be retrieved from the address IP_A and by quering the Radius Server 60, or by quering a network node in which the profiles associated with the users are provided.

In addition, the Multicast Audio-Data Server 120 retrieves the URIs of all those users involved in the conference of which it does not know this identifier, since a relevant OPTIONS step has not been carried out. For retrieving these URIs (which are required for the subsequent signalling) the Multicast Audio-Data Server 120 makes use of the identifier MSISDN$_A$. In particular, the Multicast Audio-Data Server 120 compares the identifier MSISDN$_A$ of the first user USER_A with the identifiers stored in step 1107 from FIG. 11 (the identifiers MSISDN$_I$ of all the users involved and the conference identification code ID$_C$) such that all the other users participating in the audio-data conference to be established are identified. This comparison step is indicated in FIG. 13 with the reference number 1302'.

It should be observed that the retrieval of the identifier MSISDN$_A$ of the first user and the consequent comparison with the identifiers MSISDN$_I$ (1302') are an exemplary embodiment of the association step 2006 described with reference to FIG. 2.

The Multicast Audio-Data Server 120 retrieves the identifiers MSISDN$_I$ of the other users (USER_B and USER_C), which have been previously stored, and based on the latter it queries, for example, the user profile entity (an HSS server) for obtaining the corresponding URI of each user therefrom. Alternatively, the Multicast Audio-Data Server 120 can be the URI, different from USER_A, of each user, by employing for example the respective identifier MSISDN$_I$, in the case where a correspondence has been established between MSISDN and URI which is known by the Server 120 itself, (such as URI expressed in a format like MSISDN@domain). It should be observed that the URIs of the users involved (step 1302" from FIG. 13) is an exemplary embodiment of step 2005 described with reference to FIG. 2.

When the Multicast Audio-Data Server 120 knows the URIs of all users, it sends (1303B and 1303C), through the IMS Core Network 110, to all other users involved in the audio conference (in the example, USER_B and USER_C), an INVITE message, containing:
- a request-URI containing the URI of the individual addressee user (URI_B and URI_C);
- the URI associated with the data conference (for example, in the format conference_number@domain) in the field From;
- another session descriptor (SDP descriptor) that has been suitably modified such that the users USER_B and USER_C see the Multicast Audio-Data Server 120 as a peer terminal for the data session. This can be obtained, for example, by inserting the IP address of the Multicast Audio-Data Server 120 such that the users receiving the INVITE (1303B and 1303C) see only the Multicast Audio-Data Server 120 as the peer for data session.

The addressee users, receiving the INVITE (1303B and 1303C), respond to the invitation with a confirmation message 200 OK (1304B and 1304C), which contains the user SDP descriptor: address IP_B and (IP-C), the local port P_B (P-C) of the user, which will be the local termination of the data session between Server 120 and users. The messages 200 OK (1304B and 1304C) reach the Multicast Audio-Data Server 120 since the IMS Core Network 110 forwards the message itself based on the SDP descriptor which makes the Multicast Audio-Data Server 120 a peer for those users who have received the INVITE. It should be noted that the steps 1304B and 1304C are examples of further steps, which in addition to said step 1302" (URI retrieval), allow completing step 2005 from FIG. 2, in accordance with the particular IP protocol.

Upon receipt of the message 200 OK from at least one of the users (in FIG. 13, the first response 1304B, and then the 1304C have been received), the Multicast Audio-Data Server 120 sends another message 200 OK (1305) to the originating user (i.e. the first user USER_A), which message contains the IP address and the port P$_{120}$ of the Multicast Audio-Data Server 120 in the SDP thereof, such that the latter is, for the first mobile terminal, the peer terminal of the data session. The Multicast Audio-Data Server 120 and the first user USER_A (i.e. the originator) confirm the establishment of the relative data sessions by sending an ACK message (1306) to the invited users (USER_B and USER_C) and an ACK message (1307) to the Multicast Audio-Data Server 120, respectively.

Accordingly, the first user, i.e. the originator user USER_A, sends the data to the Multicast Audio-Data Server 120 which, after it has received them, provides to replicate them and send them (1309B and 1309C) to the other users USER_B and USER_C involved. The Multicast Audio-Data Server 120 is capable of sending the data to the terminals associated with the users USER_B and USER_C because it knows the respective URI identifiers.

It is possible that the Multicast Audio-Data Server 120, when it receives the data from the first user USER_A, carries out a conversion/adaptation of their format such that they become compatible with the capabilities of the other mobile terminals.

At the end of the data sending session (i.e. when the data have been entirely transmitted), the originator user, i.e. the first user USER_A, sends to the Multicast Audio-Data Server 120 a bye message (BYE, 1310) which is replicated and sent (1311) by the Multicast Audio-Data Server 120 to all other users involved in the data session. The BYE operation is confirmed by each receiver with a message 200 OK (1312).

Figure 14:
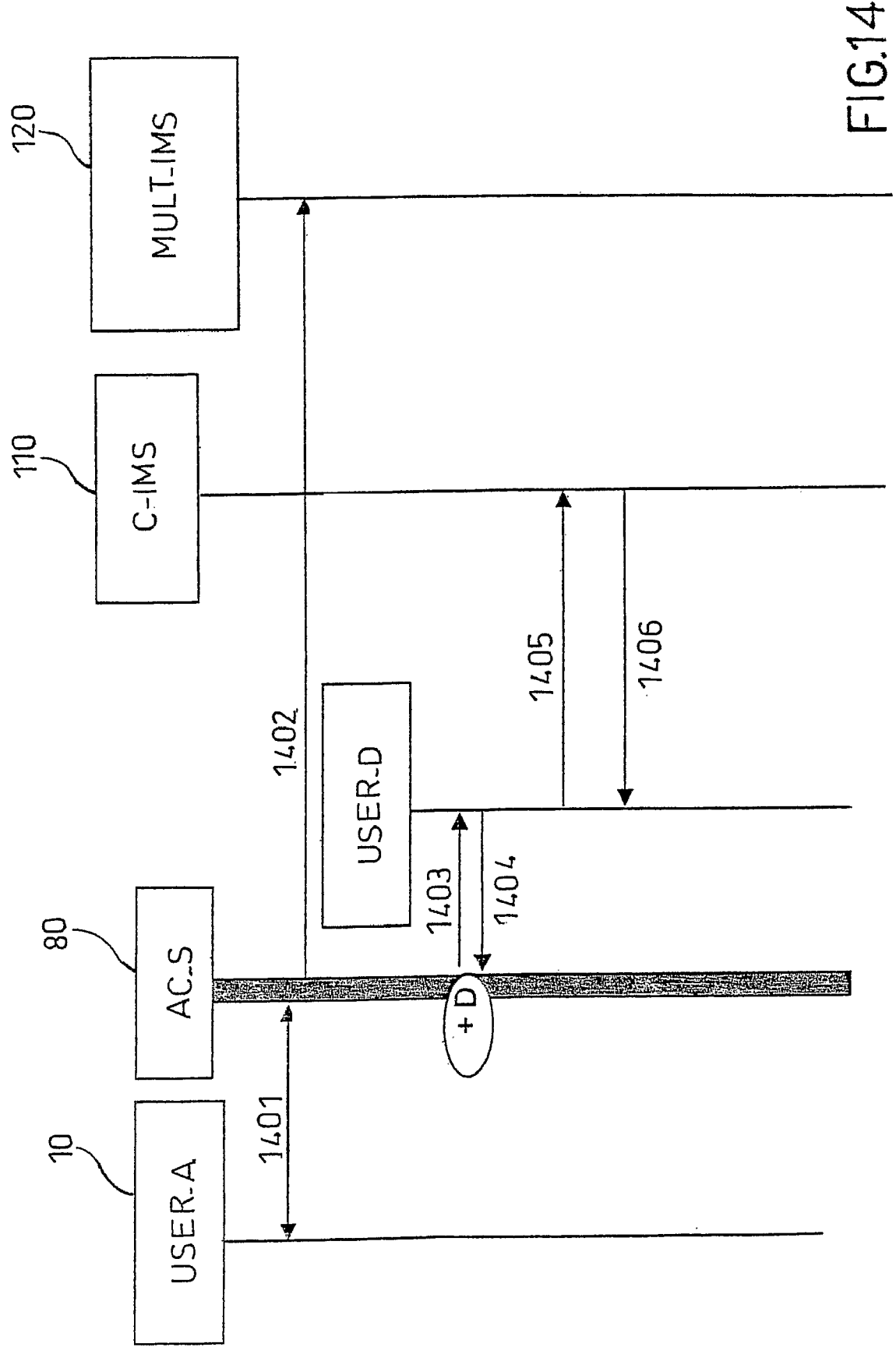
FIG. 14 and FIG. 15 illustrate examples of a flow of signalling messages in the network from FIG. 10 where a mobile terminal is either added or removed, respectively.

Also in the case where an IMS architecture is used, a user can be inserted or removed during the audio-data conference. FIG. 14 relates to the case where the new user USER_D has been inserted or added. The originator user (USER_A) sends a new user addition request message (step of New User Addition Request, 1401) to the Audio Conference Server 80 with modalities and contents similar to those described with reference to message 8001 from FIG. 8.

Based on message 1401, the Audio Conference Server 80 sends (step of Audio Conference Update, 1402) the telephone number MSISDN$_D$ of the new user USER_D to the Multicast Audio-Data Server 120, which number has to be inserted together with the conference identification code ID$_C$. Subsequently, the Audio Conference Server 80 makes a telephone call (1403) and contacts the new user USER_D who, by answering the call (1404), joins the audio conference (step +D). Furthermore, upon receipt of the voice call, the new user USER_D, by activating a data connection with the mobile network 500, registers (step REGISTER, 1405) in the IMS Core Network 110 which sends a confirmation message (1406) in a similar manner as described for FIG. 12.

Following the insertion of the new user USER_D, capability acknowledgment steps can be carried out which are similar to the steps 1208A and 1209A described above with reference to FIG. 12, and steps similar to step 1211 from FIG. 12 related to the sending of an updated participant list to all users.

Figure 15:
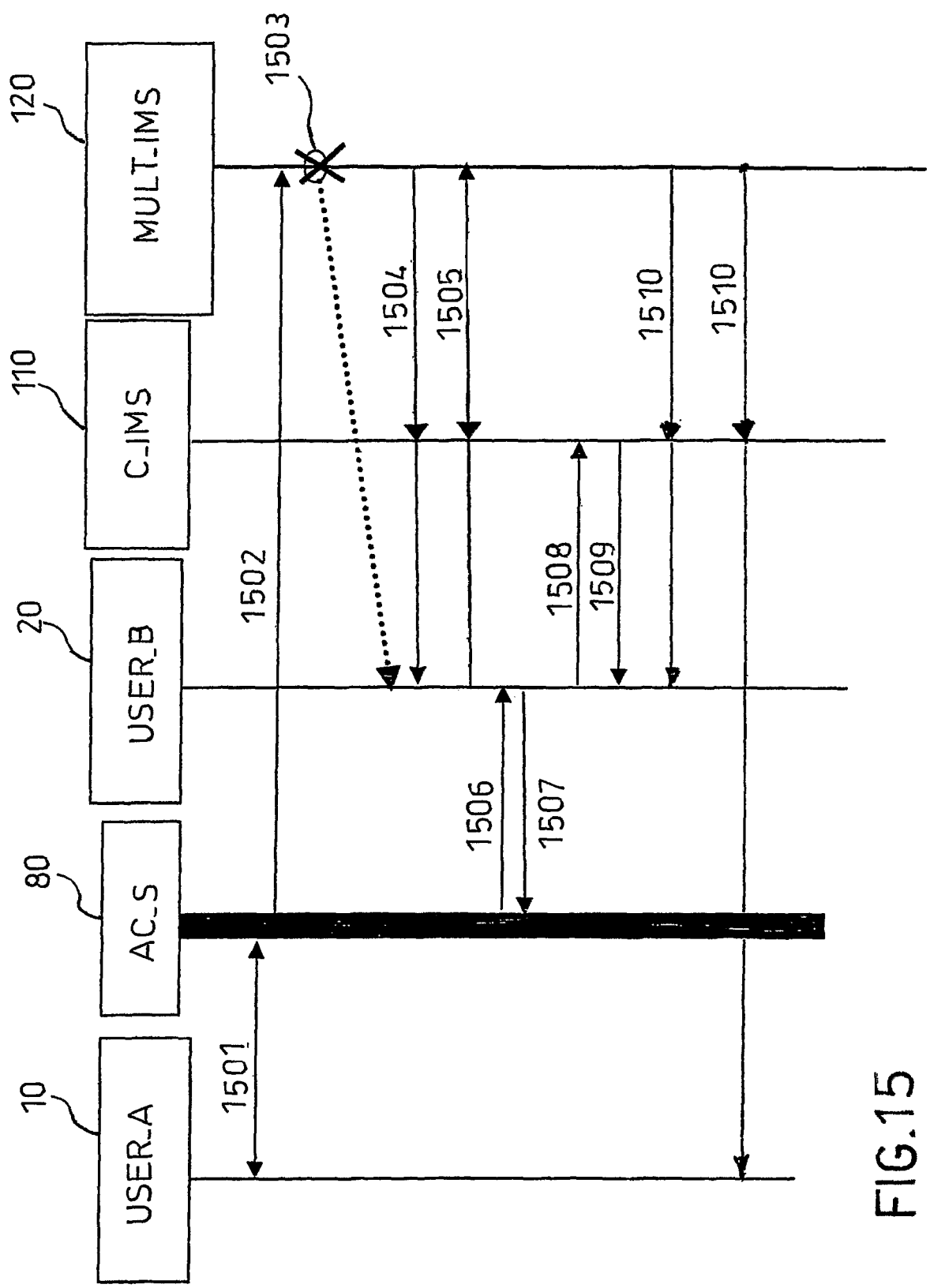

When a participant such as USER_B is removed (FIG. 15), the user USER_A of the first terminal 10 sends to the Audio Conference Server 80 a removal request for USER_B (or more users) from the established audio-video conference (step of User Removal Request, 1501). This request (1501) is tent in a similar manner as, for example, what has been described for step 8001 from FIG. 8 and contains the MSISDN identifier of user USER_B (MSISDN$_B$). The Audio Conference Server 80 sends a message containing this identifier MSISDN$_B$, the removal request, and the conference identifier ID$_C$ to which the request is referred (step of Conference Information Update, 1502) to the Multicast Audio-Data Server 120. As also described for the first embodiment with reference to FIG. 9, the request of removal from the conference can be also originated by the user himself, who does not desire to use the service any longer.

The Multicast Audio-Data Server 120, following receipt of the information contained in the message from step 1502, provides to cancel the user USER_B from the audio-data conference participant list. If the Multicast Audio-Data Server 120 receives the message 1502 during data transmission, the following applies:

if the user USER-B is receiving the data, the (packet) data connection towards this user is released (1503). For example, for carrying out this release, the Multicast Audio-Data Server 120 sends a BYE message (1504) to the second terminal 20. To the BYE message, the terminal of USER_B returns a relative confirmation 200 OK (1505) and makes the port P_B employed unavailable for receiving the data.

if the user USER-B is transmitting the data, the data connections to the user to be removed and all the receiving users are released. For example, the Multicast Audio-Data Server 120 sends a BYE message to the user to be removed and the other users, following the same the port P_B of user USER_B is no longer available for transmitting further data and the ports $P_I$ of the other terminals are no longer available for receiving the data that USER_B has transmitted.

The Audio Conference Server 80 releases the phone section (on circuit network) of the users to be removed (step of Release 1506 and relative completion 1507). Upon receipt of the Release message 1506, the users' mobile terminals will behave as follows:

if they do not participate in an active data session or if the data session has been already released, i.e. they have already received and confirmed, with the 200 OK message (1505), the BYE operation (1503) that has been sent, these users preferably unregister (1508 with 200 OK confirmation 1509) and release the data connection on the mobile network 500;

if they have a still active data session and they have not yet received the BYE operation (1503), the users release the data session to the Multicast Audio-Data Server 120, by sending a BYE operation to the Multicast Audio-Data Server 120; then, they preferably provide to unregister and release the data connection on the mobile network 500.

Following the user removal, an optional message can be sent to all the participants in the data conference, thereby allowing the same to update their conference participant list (step 1510).

Figure 16:
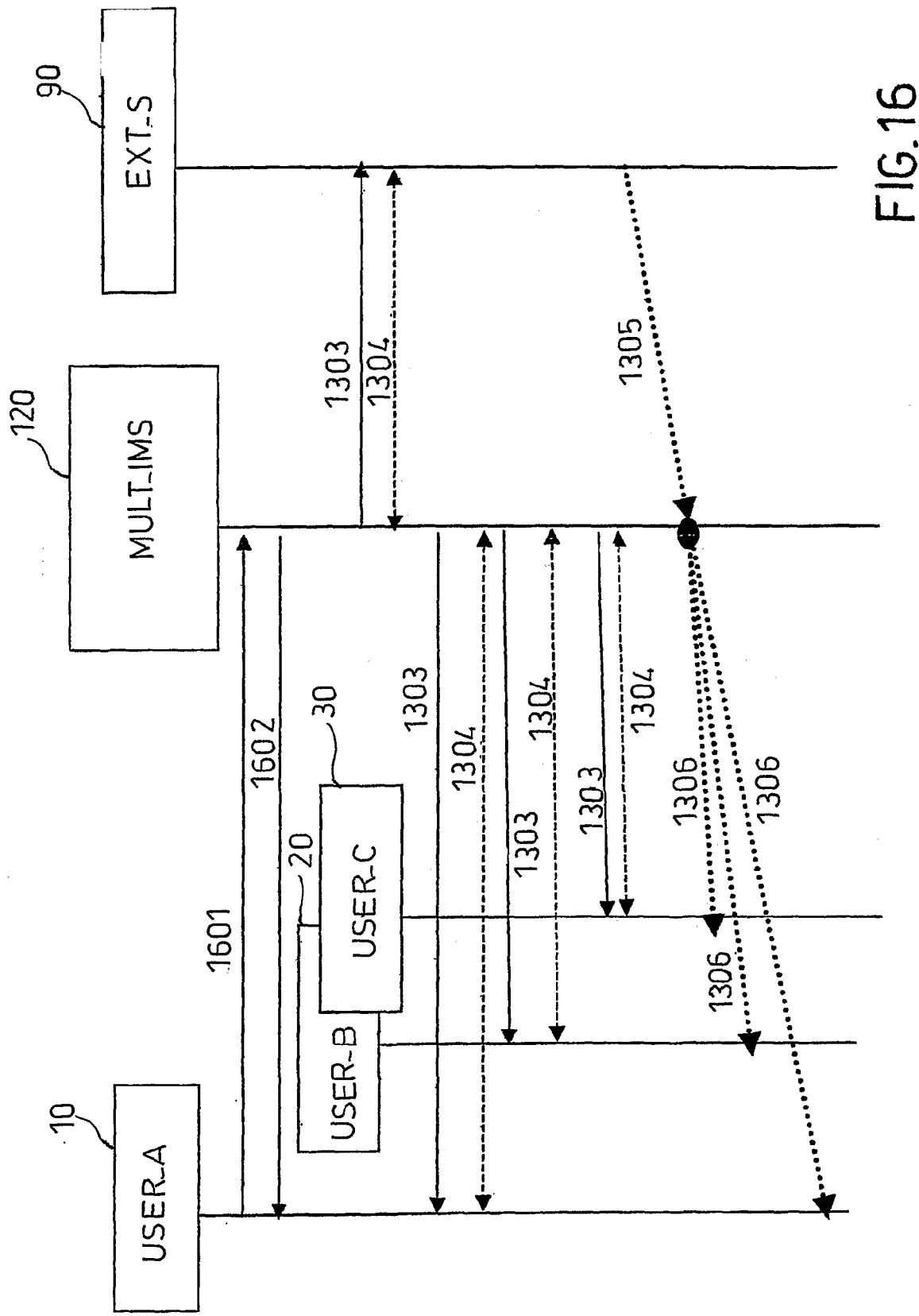
FIG. 16 illustrates an exemplary flow of operations concerning the establishment of a data conference in the network from FIG. 10 where these data are provided by an entity other than said terminals.

FIG. 16 relates to a further case where the data that the user USER_A desires to share with the other users do not initially reside in the first terminal 10, but they are requested by the External Server 90 that is associated, for example, with the packet external network 56. In this case, the first terminal 10 sends to the Multicast Audio-Data Server 120 a message for requesting the retrieval of data from the outside (step of Request of Content Retrieval from the Outside, 1601). The Multicast Audio-Data Server 120, after having confirmed the request (step of Request Confirmation, 1602), establishes a data session with the External Server 90 and the recipient mobile terminals. To establish this connection, the Multicast Audio-Data Server 120 sends INVITE messages 1303 to the External Server 90 and the recipient mobile terminals 20 and 30. These messages are similar to those described with reference to FIG. 13 and are followed by confirmation messages (200 OK, 1304). When the data session is opened, the Multicast Audio-Data Server 120 receives (1305) the data from the External Server 90, replicates the contents thereof and transmits these replications in multicast mode (1306) to the terminals 10-30.

Figure 17:
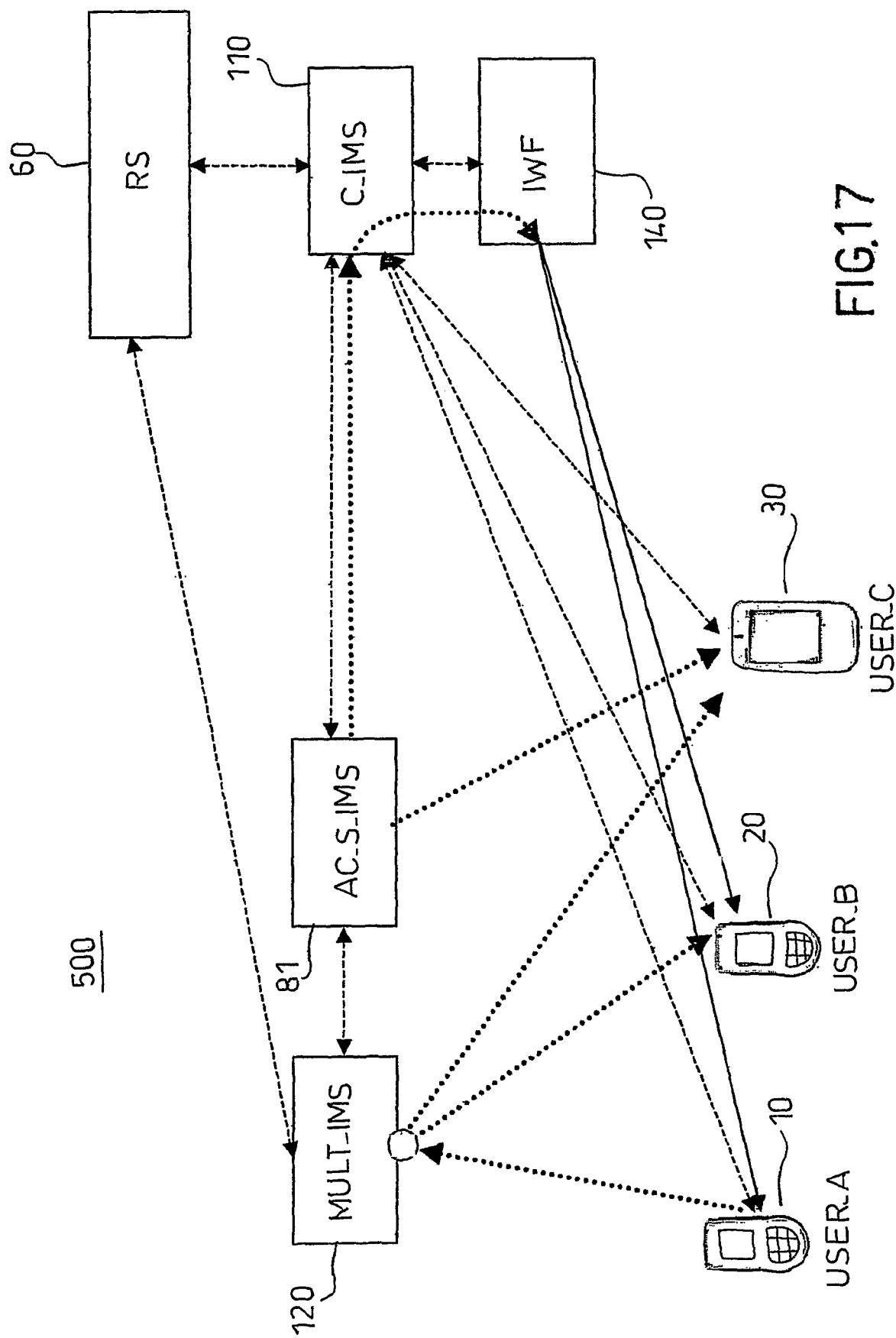
FIG. 17 illustrates, in a schematic manner and by functional blocks, a portion of a second embodiment of the network from FIG. 1 made according to the IMS architecture and in which at least one mobile terminal is provided, which is capable of providing a packet voice communication.

A third embodiment of the method from FIG. 2 will be now described, still referring to the case where the network 500 is an IMS network (such as in the embodiment from FIG. 10 to 16), but it is suitable for the case where at least one or all the terminals involved in the audio-data conference are such to employ a packet communication also for the audio conference. In FIG. 17 there is schematically illustrated the alternative embodiment of network 500 from FIG. 10 in the particular condition where the third terminal 30 associated with the user USER_C operates such that a voice communication is established by means of a packet connection.

In the network 500 from FIG. 17 the audio-conference management entity is a Packet Audio Conference Server 81 (AC_S_IMS) which, unlike the Server 80 of the above embodiments, resides in the packet domain, for example comprising an IMS infrastructure (VoIP). This Audio Conference Server 81 interacts with the circuit subnetwork 200 through an interwork block 140 IWF capable of carrying out a conversion of the traffic originating from circuit voice calls to packet traffic (and the conversion of the related signallings). The Packet Audio Conference Server 81 is, for example, an Application Server AS comprised in IMS network.

The Multicast Audio-Data Server 120 communicates with the Packet Audio Conference Server 81 similarly to what has been described with reference to FIG. 10-16. Alternatively, the functions carried out by the Servers 120 and 81 may be implemented on an individual server AS that operates, accordingly, as an individual control unit both for audio-conferences and for data-conferences.

In both cases (servers 81 and 120, either distinct or integrated in an individual server), the modalities for establishing the audio-conference and the simultaneous data-conference are similar to those described with reference to FIGS. 11, 12 and 13 (or 16), and can be easily derived therefrom. In particular, FIG. 18 highlights the difference between the mode of establishing the audio conference for the first user USER_A who operates with voice on circuit communication and for the third user USER_C who, for the voice, employs the packet communication.

Figure 18:
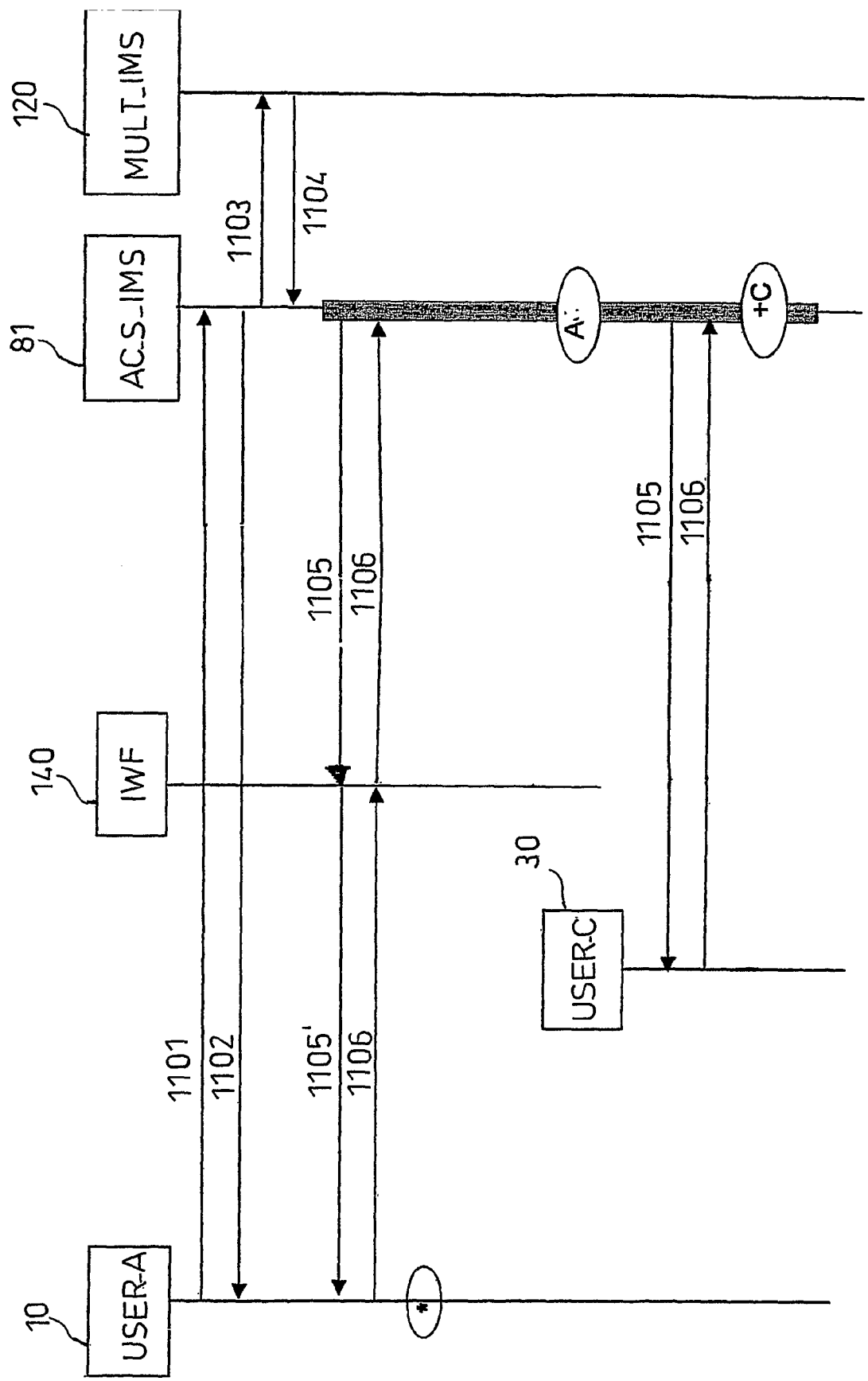
FIG. 18 illustrates an exemplary flow of operations concerning the establishment of an audio conference in the network from FIG. 17.

With reference to FIG. 18, the first terminal 10 sends a Conference Request (1101) to the Packet Audio Conference Server 81. The Packet Audio Conference Server 81 sends a Conference Request Confirmation Receipt (1102) message to the first mobile terminal 10 and, furthermore, it sends (1103) a message containing the numbers $MSISDN_I$ of all the users involved (USER_A, USER_B and USER_C), and the conference identification code $ID_C$ to the Multicast Audio-Data Server 120.

The Multicast Audio-Data Server 120 responds by sending a confirmation message (1104) to the Packet Audio Conference Server 81. The Packet Audio Conference Server 81 makes calls (1105) of the mobile terminals of each user by generating a corresponding Voice Call to them. The Voice Call 1105 is on the packet domain and the interwork block 140 converts the same in a circuit Voice Call 1105' which is routed to the first terminal 10 (USER_A).

To the circuit Voice Call 1105' there follows an Answer to the Call 1106 which for the first terminal 10 is on the circuit, which is converted by the interwork block 140 in a packet Answer to the Call 1106' for reaching the Packet Audio Conference Server 81.

On the contrary, referring to the third terminal 30, the Voice Call 1105 directed thereto on packet domain reaches the third user USER_C in packet form, without the intervention of the interwork block 140. The third user USER_C sends the corresponding packet Answer to the Call 1106 which reaches the Packet Audio Conference Server 81, not requiring a conversion operated by the interwork block 140.

In FIG. 18, for simplicity, the interactions with the IMS Core Network 110 (FIG. 17) that can take place whenever there is an exchange of messages/data on IMS domain have not been indicated. For example, the exchange of messages/data between the Audio Conference Server 81 and the interwork block 140 provides an interaction with the IMS Core Network 110. Similarly, the exchange of messages/data between the third terminal 30 and the Audio Conference Server 81 provides the intervention of the IMS Core Network 110.

The modes with which the data-conference is established and with which the data are transmitted, which are sent by a user to the other users are similar to those described with reference to FIGS. 12 and 13 (or 16).

The teachings of the invention have considerable advantages. Due to the teachings of the invention, a conference combinational service can be implemented, thereby making this service very attractive for users. Furthermore, the combinational service as described can be implemented on users' terminals such that the latter can utilize the same (enabling the audio conference, and enabling the data conference) with uncomplicated and substantially automatic modes.

In addition, it should be understood from the above description that the conference combinational service in accordance with the invention is fully compatible with the circuit network and packet network technologies, both those existing since a long time (such as GSM, GPRS, IP networks) and those introduced more recently or which will be introduced in the future (such as UMTS networks and IMS networks). This allows the network providers to implement the service substantially avoiding any modifications or adaptations to the network installed or the protocols employed.

The invention claimed is:

1. A method of enabling a combinational service in a communication network wherein a plurality of terminals operate, comprising:
   establishing a first plurality of connections toward the plurality of terminals based on first identifiers, wherein the first identifiers identify the respective terminals in a first network;
   providing a management entity with the first identifiers;
   receiving a request to establish a second plurality of connections toward selected terminals in a second network, wherein the request includes a session identifier;
   verifying, by the management entity, that the selected terminals are included in said plurality of terminals, based on a determination that the session identifier identifies the first plurality of connections;
   providing the management entity with second identifiers of the selected terminals, wherein the second identifiers identify the respective terminals in the second network;
   for each second identifier, identifying, from the first identifiers provided to the management entity, a first identifier that identifies a same terminal that is identified by the respective second identifier;
   associating the second identifiers and the respective identified first identifiers with the combinational service;
   providing to the selected terminals a third identifier of the management entity in the second network;
   establishing, by means of the management entity, a second plurality of connections toward said selected terminals by employing the second identifiers of the selected terminals and the third identifier of the management entity; and
   granting an authorization to transmit information in the second network, by the management entity, to one of the selected terminals upon receiving multiple transmission requests from the selected terminals.

2. The method according to claim 1, wherein at least one of said first and second pluralities of connections supports a conference service between more than two terminals.

3. The method according to claim 1, wherein one of said first and second pluralities of connections supports an audio communication and the other of said first and second pluralities of connections supports a data communication.

4. The method according to claim 1, wherein at least one of said first and second pluralities of connections is based on a circuit domain of said network and the other of said first and second pluralities of connections is based on a packet domain of said network.

5. The method according to claim 1, wherein one of said first and second pluralities of connections is based partially on a circuit domain and partially on a packet domain of said network.

6. The method according to claim 1, wherein the first identifiers are circuit domain communication identifiers.

7. The method according to claim 6, wherein providing the management entity with the first identifiers comprises:
   transmitting the first identifiers from a first entity that manages the first plurality of connections toward the management entity.

8. The method according to claim 7, wherein the second identifiers are packet domain communication identifiers.

9. The method according to claim 8, wherein providing the management entity with the second identifiers comprises:
   transmitting a respective packet domain communication identifier from a first terminal of the plurality of connections toward a second management entity;
   retrieving, based on the packet domain communication identifier, a circuit domain communication identifier which is associated with said first terminal, said retrieval being carried out by the second management entity; and
   transmitting the packet domain communication identifier and the circuit domain communication identifier from the second management entity toward the management entity.

10. The method according to claim 9, wherein associating the first identifiers and the second identifiers with the combinational service comprises:
    correlating by the management entity the circuit domain communication identifier being transmitted by the first management entity with the circuit domain communication identifier being transmitted by the second management entity.

11. The method according to claim 8, wherein the second identifiers comprise at least one of the following identifiers: an internet protocol address for each of said selected terminals, a port identifier for each of said selected terminals for communication according to the internet protocol, and a uniform resource indicator identifier for each of said selected terminals.

12. The method according to claim 8, wherein providing the management entity with the second identifiers comprises:
    transmitting by an originating terminal at least one packet domain communication identifier of the originator to the management entity; and retrieving by the management entity, based on said first identifiers, a plurality of packet domain communication identifiers of said selected terminals distinct from the originator terminal.

13. The method according to claim 12, further comprising:
contacting by the management entity the selected terminals distinct from the originating terminal by means of signalling messages based on said plurality of packet domain identifiers; and
transmitting by the selected terminals distinct from the originator terminal respective further identifiers of packet domain communication toward the management entity.

14. The method according to claim 12, wherein associating the first identifiers and the second identifiers with the same combinational service comprises:
retrieving by the management entity a circuit domain communication identifier of the originator; and
comparing by the management entity the circuit domain communication identifier of the originator with said first identifiers.

15. The method according to claim 7, wherein establishing the first plurality of connections based on the first identifiers of the terminals comprises:
transmitting a request for establishing the first plurality of connections toward the first entity and by a calling terminal among the plurality of terminals; and
causing, by the first entity, the establishment of the first plurality of connections.

16. The method according to claim 15, wherein carrying out by the first entity a transmission toward all the terminals comprises:
making corresponding calls on a circuit domain.

17. The method according to claim 15, wherein carrying out by the first entity a transmission toward all the terminals comprises:
carrying out at least one call on a packet domain, and such as to reach at least one terminal operating on packet domain for the first plurality of connections.

18. The method according to claim 17, wherein carrying out by the first entity a transmission toward all the terminals comprises:
making at least one call on a packet domain and converting this call on a circuit domain by means of a conversion entity, such as to reach at least one terminal operating on a circuit domain for the first plurality of connections.

19. The method according to claim 18, wherein said packet domain identifiers of the originator and the terminals distinct from the originator are uniform resource indicators of the respective terminals.

20. The method according to claim 19, further comprising:
sending from a first terminal a request message to the management entity for data characteristics that the management entity is capable of handling with reference to said second plurality of connections.

21. The method according to claim 6, wherein first identifiers comprise the first terminal identifiers of each of said terminals.

22. The method according to claim 1, wherein said network comprises a mobile network and at least one portion of said terminals comprises mobile terminals.

23. A method for utilizing a combinational service, comprising:
enabling the combinational service in accordance with the method of claim 1;
sending by a sender terminal information intended for recipient terminals among said selected terminals to the management entity; and
transmitting by the management entity the information by means of said second plurality of connections toward the recipient terminals.

24. The method according to claim 23, further comprising replicating the information in the management entity and transmitting the information to the recipient terminals by means of the second plurality of packet domain connections.

25. The method according to claim 23, wherein said first plurality of established connections is associated with voice telephone connections such that an audio conference is established among the plurality of terminals.

26. The method according to claim 23, wherein the information transmitted to the recipient terminals is of the data type, and the transmission to the recipient terminals leads to the establishment of a data conference among the plurality of terminals, which is simultaneous with the audio conference.

27. The method according to claim 26, wherein said information comprises at least one of the following data: at least one still image, moving images, files, electronic documents, and software applications.

28. The method according to claim 23, wherein information between each selected terminal and the management entity is transmitted/received in peer-to-peer mode.

29. A non-transitory computer readable medium encoded with a software application installed on a management apparatus for enabling a combinational service in a communication network in which a plurality of terminals can operate, comprising software code portions for:
receiving first identifiers of the plurality of terminals to which a first plurality of connections has been established, wherein the first identifiers identify the respective terminals in a first network;
receiving a request to establish a second plurality of connections toward selected terminals in a second network, wherein the request includes a session identifier;
verifying that the selected terminals are included in said plurality of terminals, based on a determination that the session identifier identifies the first plurality of connections;
storing second identifiers of the selected terminals, wherein the second identifiers identify the respective terminals in the second network;
for each second identifier, identifying, from the first identifiers provided to the management entity, a first identifier that identifies a same terminal that is identified by the respective second identifier;
associating the second identifiers and the respective identified first identifiers with the combinational service;
providing to the selected terminals a third identifier of the management entity in the second network;
establishing a second plurality of connections toward said selected terminals by employing the second identifiers of the selected terminals and the third identifier of the management entity; and
granting an authorization to transmit information in the second network to one of the selected terminals upon receiving multiple transmission requests from the selected terminals.

30. The non-transitory computer readable medium according to claim 29, capable of establishing the second plurality of connections for exchanging information by means of a packet domain of the communication network.

31. The non-transitory computer readable medium according to claim 29, wherein the exchange of information between the selected terminals occurs in peer-to-peer mode with the management apparatus.

32. The non-transitory computer readable medium according to claim 29, wherein management is allowed by the signalling message management entity in accordance with session initiation protocol.

33. The non-transitory computer readable medium according to claim 29, comprising further software codes capable of handling information comprising at least one of the following typologies: at least one still image, moving images, files, electronic documents, and software applications.

34. A management apparatus for a combinational service capable of being installed in a communication network, comprising means for storing a non-transitory computer readable medium according to claim 29.

35. The apparatus according to claim 34, wherein said apparatus is a server capable of operating in an internet protocol multimedia subsystem network.

36. A communication network capable of establishing a combinational service, comprising a management apparatus for a combinational service provided according to claim 34.

37. The communication network according to claim 36, further comprising a management entity capable of establishing said first plurality of connections.

* * * * *